(12) United States Patent
Hooper et al.

(10) Patent No.: US 7,352,769 B2
(45) Date of Patent: Apr. 1, 2008

(54) MULTIPLE CALENDAR SCHEDULE RESERVATION STRUCTURE AND METHOD

(75) Inventors: Donald F. Hooper, Shrewsbury, MA (US); Suresh Kalkunte, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 999 days.

(21) Appl. No.: 10/242,326

(22) Filed: Sep. 12, 2002

(65) Prior Publication Data

US 2004/0052269 A1    Mar. 18, 2004

(51) Int. Cl.
*H04B 7/212* (2006.01)

(52) U.S. Cl. .................. 370/442; 370/458; 370/463

(58) Field of Classification Search ........... 370/442, 370/463, 458, 229, 235, 253, 471, 230.1, 370/232, 233, 235.1, 322, 238
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,623,001 A | 11/1971 | Kleist et al. | |
| 3,736,566 A | 5/1973 | Anderson et al. | |
| 3,792,441 A | 2/1974 | Wymore et al. | |
| 3,889,243 A | 6/1975 | Drimak | |
| 3,940,745 A | 2/1976 | Sajeva | |
| 4,016,548 A | 4/1977 | Law et al. | |
| 4,032,899 A | 6/1977 | Jenny et al. | |
| 4,075,691 A | 2/1978 | Davis et al. | |
| 4,130,890 A | 12/1978 | Adam | |
| 4,400,770 A | 8/1983 | Chan et al. | |
| 4,514,807 A | 4/1985 | Nogi | |
| 4,523,272 A | 6/1985 | Fukunaga et al. | |
| 4,658,351 A | 4/1987 | Teng | |
| 4,709,347 A | 11/1987 | Kirk | |
| 4,745,544 A | 5/1988 | Renner et al. | |
| 4,788,640 A | 11/1988 | Hansen | |
| 4,831,358 A | 5/1989 | Ferrio et al. | |
| 4,858,108 A | 8/1989 | Ogawa et al. | |
| 4,866,664 A | 9/1989 | Burkhardt, Jr. et al. | |
| 4,890,218 A | 12/1989 | Bram | |

(Continued)

FOREIGN PATENT DOCUMENTS

EP    0 379 709    8/1990

(Continued)

OTHER PUBLICATIONS

"10-/100-Mbps Ethernet Media Access Controller (MAC) Core", NEC, 1998, pp. 1-5.

(Continued)

*Primary Examiner*—Chi Pham
*Assistant Examiner*—Alexander O. Boakye
(74) *Attorney, Agent, or Firm*—Fish & Richardson P.C.

(57) ABSTRACT

A machine-based method includes scheduling data units into respective time slots of reservation groups by representing the time slots in a base vector. The time slots of each of the reservation groups corresponds to a contiguous block in the base vector. Groups of time slots are represented in a higher-level vector having fewer elements than the base vector.

48 Claims, 13 Drawing Sheets

U.S. PATENT DOCUMENTS

| | | |
|---|---|---|
| 4,890,222 A | 12/1989 | Kirk |
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,251,205 A | 10/1993 | Callon et al. |
| 5,255,239 A | 10/1993 | Taborn et al. |
| 5,263,169 A | 11/1993 | Genusov et al. |
| 5,313,454 A | 5/1994 | Bustini et al. |
| 5,347,648 A | 9/1994 | Stamm et al. |
| 5,367,678 A | 11/1994 | Lee et al. |
| 5,379,295 A | 1/1995 | Yonehara |
| 5,379,432 A | 1/1995 | Orton et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,469 A | 4/1995 | Chung et al. |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,452,452 A | 9/1995 | Gaetner et al. |
| 5,459,842 A | 10/1995 | Begun et al. |
| 5,459,843 A | 10/1995 | Davis et al. |
| 5,463,625 A | 10/1995 | Yasrebi |
| 5,467,452 A | 11/1995 | Blum et al. |
| 5,475,856 A | 12/1995 | Kogge |
| 5,485,455 A | 1/1996 | Dobbins et al. |
| 5,515,296 A | 5/1996 | Agarwal |
| 5,517,648 A | 5/1996 | Bertone et al. |
| 5,539,737 A | 7/1996 | Lo et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,476 A | 10/1996 | Sherer et al. |
| 5,568,617 A | 10/1996 | Kametani |
| 5,574,922 A | 11/1996 | James |
| 5,581,729 A | 12/1996 | Nistala et al. |
| 5,592,622 A | 1/1997 | Isfeld et al. |
| 5,613,071 A | 3/1997 | Rankin et al. |
| 5,613,136 A | 3/1997 | Casavant et al. |
| 5,617,327 A | 4/1997 | Duncan |
| 5,623,489 A | 4/1997 | Cotton et al. |
| 5,627,829 A | 5/1997 | Gleeson et al. |
| 5,630,074 A | 5/1997 | Beltran |
| 5,630,130 A | 5/1997 | Perotto et al. |
| 5,633,865 A | 5/1997 | Short |
| 5,644,623 A | 7/1997 | Gulledge |
| 5,649,110 A | 7/1997 | Ben-Nun et al. |
| 5,649,157 A | 7/1997 | Williams |
| 5,651,002 A | 7/1997 | Van Seters et al. |
| 5,659,687 A | 8/1997 | Kim et al. |
| 5,680,641 A | 10/1997 | Sidman |
| 5,689,566 A | 11/1997 | Nguyen |
| 5,692,126 A | 11/1997 | Templeton et al. |
| 5,699,537 A | 12/1997 | Sharangpani et al. |
| 5,701,434 A | 12/1997 | Nakagawa |
| 5,717,898 A | 2/1998 | Kagan et al. |
| 5,721,870 A | 2/1998 | Matsumoto |
| 5,724,574 A | 3/1998 | Stratigos et al. |
| 5,740,402 A | 4/1998 | Bratt et al. |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,754,764 A | 5/1998 | Davis et al. |
| 5,761,507 A | 6/1998 | Govett |
| 5,761,522 A | 6/1998 | Hisanaga et al. |
| 5,764,915 A | 6/1998 | Heimsoth et al. |
| 5,768,528 A | 6/1998 | Stumm |
| 5,781,551 A | 7/1998 | Born |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,805,816 A | 9/1998 | Picazo, Jr. et al. |
| 5,809,235 A | 9/1998 | Sharma et al. |
| 5,809,237 A | 9/1998 | Watts et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,828,881 A | 10/1998 | Wang |
| 5,828,901 A | 10/1998 | O'Toole et al. |
| 5,832,215 A | 11/1998 | Kato et al. |
| 5,835,755 A | 11/1998 | Stellwagen, Jr. |
| 5,838,988 A | 11/1998 | Panwar et al. |
| 5,850,399 A | 12/1998 | Ganmukhi et al. |
| 5,850,530 A | 12/1998 | Chen et al. |
| 5,854,922 A | 12/1998 | Gravenstein et al. |
| 5,860,138 A | 1/1999 | Engebretsen et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,898,686 A | 4/1999 | Virgile |
| 5,898,701 A | 4/1999 | Johnson |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,918,235 A | 6/1999 | Kirshenbaum et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,953,336 A | 9/1999 | Moore et al. |
| 5,958,031 A | 9/1999 | Kim |
| 5,961,628 A | 10/1999 | Nguyen et al. |
| 5,968,169 A | 10/1999 | Pickett |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 5,995,513 A | 11/1999 | Harrand et al. |
| 6,012,151 A | 1/2000 | Mano |
| 6,014,729 A | 1/2000 | Lannan et al. |
| 6,023,742 A | 2/2000 | Ebeling et al. |
| 6,032,190 A | 2/2000 | Bremer et al. |
| 6,032,218 A | 2/2000 | Lewin et al. |
| 6,047,002 A | 4/2000 | Hartmann et al. |
| 6,049,867 A | 4/2000 | Eickemeyer et al. |
| 6,058,168 A | 5/2000 | Braband |
| 6,061,710 A | 5/2000 | Eickemeyer et al. |
| 6,067,300 A | 5/2000 | Baumert et al. |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,079,008 A | 6/2000 | Clery, III |

| | | | |
|---|---|---|---|
| 6,085,215 A | 7/2000 | Ramakrishnan et al. | |
| 6,085,248 A | 7/2000 | Sambamurthy et al. | |
| 6,085,294 A | 7/2000 | Van Doren et al. | |
| 6,092,127 A | 7/2000 | Tausheck | |
| 6,092,158 A | 7/2000 | Harriman et al. | |
| 6,104,700 A | 8/2000 | Haddock et al. | |
| 6,111,886 A | 8/2000 | Stewart | |
| 6,112,016 A | 8/2000 | MacWilliams et al. | |
| 6,122,251 A | 9/2000 | Shinohara | |
| 6,128,669 A | 10/2000 | Moriarty et al. | |
| 6,134,665 A | 10/2000 | Klein et al. | |
| 6,141,677 A | 10/2000 | Hanif et al. | |
| 6,141,689 A | 10/2000 | Yasrebi | |
| 6,141,765 A | 10/2000 | Sherman | |
| 6,144,669 A | 11/2000 | Williams et al. | |
| 6,145,054 A | 11/2000 | Mehrotra et al. | |
| 6,157,955 A | 12/2000 | Narad et al. | |
| 6,160,562 A | 12/2000 | Chin et al. | |
| 6,170,051 B1 | 1/2001 | Dowling | |
| 6,182,177 B1 | 1/2001 | Harriman | |
| 6,195,676 B1 | 2/2001 | Spix et al. | |
| 6,199,133 B1 | 3/2001 | Schnell | |
| 6,201,807 B1 | 3/2001 | Prasanna | |
| 6,212,542 B1 | 4/2001 | Kahle et al. | |
| 6,212,544 B1 | 4/2001 | Borkenhagen et al. | |
| 6,212,604 B1 | 4/2001 | Tremblay | |
| 6,212,611 B1 | 4/2001 | Nizar et al. | |
| 6,216,220 B1 | 4/2001 | Hwang | |
| 6,223,207 B1 | 4/2001 | Lucovsky et al. | |
| 6,223,238 B1 | 4/2001 | Meyer et al. | |
| 6,223,243 B1 | 4/2001 | Ueda et al. | |
| 6,223,274 B1 | 4/2001 | Catthoor et al. | |
| 6,223,279 B1 | 4/2001 | Nishimura et al. | |
| 6,247,025 B1 | 6/2001 | Bacon | |
| 6,256,713 B1 | 7/2001 | Audityan et al. | |
| 6,269,391 B1 | 7/2001 | Gillespie | |
| 6,272,109 B1 | 8/2001 | Pei et al. | |
| 6,272,520 B1 | 8/2001 | Sharangpani et al. | |
| 6,272,616 B1 | 8/2001 | Fernando et al. | |
| 6,275,505 B1 | 8/2001 | O'Loughlin et al. | |
| 6,279,113 B1 | 8/2001 | Vaidya | |
| 6,282,169 B1 | 8/2001 | Kiremidjian | |
| 6,286,083 B1 | 9/2001 | Chin et al. | |
| 6,289,011 B1 | 9/2001 | Seo et al. | |
| 6,295,600 B1 | 9/2001 | Parady | |
| 6,298,370 B1 | 10/2001 | Tang et al. | |
| 6,307,789 B1 | 10/2001 | Wolrich et al. | |
| 6,311,261 B1 | 10/2001 | Chamdani et al. | |
| 6,320,861 B1 | 11/2001 | Adam et al. | |
| 6,324,624 B1 | 11/2001 | Wolrich et al. | |
| 6,338,078 B1 | 1/2002 | Chang et al. | |
| 6,345,334 B1 | 2/2002 | Nakagawa et al. | |
| 6,347,344 B1 | 2/2002 | Baker et al. | |
| 6,349,331 B1 | 2/2002 | Andra et al. | |
| 6,356,962 B1 | 3/2002 | Kasper et al. | |
| 6,359,911 B1 | 3/2002 | Movshovich et al. | |
| 6,360,262 B1 | 3/2002 | Guenthner et al. | |
| 6,360,277 B1 | 3/2002 | Ruckley et al. | |
| 6,366,998 B1 | 4/2002 | Mohamed | |
| 6,373,848 B1 | 4/2002 | Allison et al. | |
| 6,377,998 B2 | 4/2002 | Noll et al. | |
| 6,389,031 B1 * | 5/2002 | Chao et al. | 370/412 |
| 6,389,449 B1 | 5/2002 | Nemirovsky et al. | |
| 6,393,026 B1 | 5/2002 | Irwin | |
| 6,393,483 B1 | 5/2002 | Latif et al. | |
| 6,404,737 B1 | 6/2002 | Novik et al. | |
| 6,415,338 B1 | 7/2002 | Habot | |
| 6,418,488 B1 | 7/2002 | Chilton et al. | |
| 6,424,657 B1 | 7/2002 | Voit et al. | |
| 6,424,659 B2 | 7/2002 | Viswanadham et al. | |
| 6,426,940 B1 | 7/2002 | Seo et al. | |
| 6,427,943 B1 | 7/2002 | Spinney et al. | |
| 6,427,196 B1 | 7/2002 | Adiletta et al. | |
| 6,430,626 B1 | 8/2002 | Witkowski et al. | |
| 6,434,145 B1 | 8/2002 | Opsasnick et al. | |
| 6,438,132 B1 | 8/2002 | Vincent et al. | |
| 6,438,134 B1 | 8/2002 | Chow et al. | |
| 6,448,812 B1 | 9/2002 | Bacigalupo | |
| 6,453,404 B1 | 9/2002 | Bereznyi et al. | |
| 6,457,015 B1 | 9/2002 | Eastham | |
| 6,463,035 B1 | 10/2002 | Moore | |
| 6,463,072 B1 | 10/2002 | Wolrich et al. | |
| 6,463,480 B2 | 10/2002 | Kikuchi et al. | |
| 6,463,527 B1 | 10/2002 | Vishkin | |
| 6,466,898 B1 | 10/2002 | Chan | |
| 6,477,562 B2 | 11/2002 | Nemirovsky et al. | |
| 6,484,224 B1 | 11/2002 | Robins et al. | |
| 6,501,731 B1 | 12/2002 | Chong et al. | |
| 6,507,862 B1 | 1/2003 | Joy et al. | |
| 6,522,188 B1 | 2/2003 | Poole | |
| 6,526,451 B2 | 2/2003 | Kasper | |
| 6,526,452 B1 | 2/2003 | Petersen et al. | |
| 6,529,983 B1 | 3/2003 | Marshall et al. | |
| 6,532,509 B1 | 3/2003 | Wolrich et al. | |
| 6,535,878 B1 | 3/2003 | Guedalia et al. | |
| 6,552,826 B2 | 4/2003 | Adler et al. | |
| 6,553,406 B1 | 4/2003 | Berger et al. | |
| 6,560,667 B1 | 5/2003 | Wolrich et al. | |
| 6,570,850 B1 | 5/2003 | Gutierrez et al. | |
| 6,577,542 B2 | 6/2003 | Wolrich et al. | |
| 6,584,522 B1 | 6/2003 | Wolrich et al. | |
| 6,587,906 B2 | 7/2003 | Wolrich et al. | |
| 6,604,125 B1 | 8/2003 | Belkin | |
| 6,606,704 B1 | 8/2003 | Adiletta et al. | |
| 6,625,654 B1 | 9/2003 | Wolrich et al. | |
| 6,628,668 B1 | 9/2003 | Hutzli et al. | |
| 6,629,147 B1 | 9/2003 | Grow | |
| 6,629,236 B1 | 9/2003 | Aipperspach et al. | |
| 6,631,422 B1 | 10/2003 | Althaus et al. | |
| 6,631,430 B1 | 10/2003 | Wolrich et al. | |
| 6,631,462 B1 | 10/2003 | Wolrich et al. | |
| 6,657,963 B1 | 12/2003 | Paquette et al. | |
| 6,658,551 B1 | 12/2003 | Berenbaum et al. | |
| 6,661,774 B1 | 12/2003 | Lauffenburger et al. | |
| 6,661,794 B1 | 12/2003 | Wolrich et al. | |
| 6,665,699 B1 | 12/2003 | Hunter et al. | |
| 6,665,755 B2 | 12/2003 | Modelski et al. | |
| 6,667,920 B2 | 12/2003 | Wolrich et al. | |
| 6,668,317 B1 | 12/2003 | Bernstein et al. | |
| 6,671,827 B2 | 12/2003 | Guilford et al. | |
| 6,675,190 B1 | 1/2004 | Schabernack et al. | |
| 6,675,192 B2 | 1/2004 | Emer et al. | |
| 6,678,746 B1 | 1/2004 | Russell et al. | |
| 6,680,933 B1 | 1/2004 | Cheesman et al. | |
| 6,681,300 B2 | 1/2004 | Wolrich et al. | |
| 6,684,326 B1 | 1/2004 | Cromer et al. | |
| 6,694,380 B1 | 2/2004 | Wolrich et al. | |
| 6,697,379 B1 | 2/2004 | Jacquet et al. | |
| 6,721,325 B1 | 4/2004 | Duckering et al. | |
| 6,724,767 B1 | 4/2004 | Chong et al. | |
| 6,728,845 B2 | 4/2004 | Adiletta | |
| 6,732,187 B1 | 5/2004 | Lougheed et al. | |
| 6,754,211 B1 | 6/2004 | Brown | |
| 6,754,222 B1 | 6/2004 | Joung et al. | |
| 6,768,717 B1 | 7/2004 | Reynolds et al. | |
| 6,775,284 B1 | 8/2004 | Calvignac et al. | |
| 6,792,488 B2 | 9/2004 | Wolrich et al. | |
| 6,798,744 B1 | 9/2004 | Loewen et al. | |
| 6,826,615 B2 | 11/2004 | Barrall et al. | |
| 6,834,053 B1 | 12/2004 | Stacey et al. | |
| 6,850,521 B1 | 2/2005 | Kadambi et al. | |
| 6,856,622 B1 | 2/2005 | Calamvokis et al. | |
| 6,873,618 B1 | 3/2005 | Weaver | |
| 6,876,561 B2 | 4/2005 | Wolrich et al. | |
| 6,895,457 B2 | 5/2005 | Wolrich et al. | |
| 6,925,637 B2 | 8/2005 | Thomas et al. | |

| | | |
|---|---|---|
| 6,931,641 B1 | 8/2005 | Davis et al. |
| 6,934,780 B2 | 8/2005 | Modelski et al. |
| 6,934,951 B2 | 8/2005 | Wilkinson et al. |
| 6,938,147 B1 | 8/2005 | Joy et al. |
| 6,944,850 B2 | 9/2005 | Hooper et al. |
| 6,947,425 B1 | 9/2005 | Hooper et al. |
| 6,952,824 B1 | 10/2005 | Hooper et al. |
| 6,959,002 B2 | 10/2005 | Wynne et al. |
| 6,967,963 B1 | 11/2005 | Houh et al. |
| 6,976,095 B1 | 12/2005 | Wolrich et al. |
| 6,981,077 B2 | 12/2005 | Modelski et al. |
| 6,983,350 B1 | 1/2006 | Wheeler et al. |
| 7,006,495 B2 | 2/2006 | Hooper |
| 7,065,569 B2 | 6/2006 | Teraslinna |
| 7,069,548 B2 | 6/2006 | Kushlis |
| 7,096,277 B2 | 8/2006 | Hooper |
| 7,100,102 B2 | 8/2006 | Hooper et al. |
| 7,111,072 B1 | 9/2006 | Matthews et al. |
| 7,111,296 B2 | 9/2006 | Wolrich et al. |
| 7,124,196 B2 | 10/2006 | Hooper |
| 7,126,952 B2 | 10/2006 | Hooper et al. |
| 7,149,786 B1 | 12/2006 | Bohringer et al. |
| 7,181,742 B2 | 2/2007 | Hooper |
| 7,191,321 B2 | 3/2007 | Bernstein et al. |
| 7,206,858 B2 | 4/2007 | Hooper et al. |
| 7,248,584 B2 | 7/2007 | Hooper |
| 2001/0023487 A1 | 9/2001 | Kawamoto |
| 2002/0027448 A1 | 3/2002 | Bacigalupo |
| 2002/0041520 A1 | 4/2002 | Wolrich et al. |
| 2002/0075878 A1 | 6/2002 | Lee et al. |
| 2002/0118692 A1 | 8/2002 | Oberman et al. |
| 2002/0150047 A1 | 10/2002 | Knight et al. |
| 2002/0181194 A1 | 12/2002 | Ho et al. |
| 2003/0043803 A1 | 3/2003 | Hooper |
| 2003/0067934 A1 | 4/2003 | Hooper et al. |
| 2003/0086434 A1 | 5/2003 | Kloth |
| 2003/0105901 A1 | 6/2003 | Wolrich et al. |
| 2003/0105917 A1 | 6/2003 | Ostler et al. |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. |
| 2003/0131198 A1 | 7/2003 | Wolrich et al. |
| 2003/0140196 A1 | 7/2003 | Wolrich et al. |
| 2003/0145159 A1 | 7/2003 | Adiletta et al. |
| 2003/0147409 A1 | 8/2003 | Wolrich et al. |
| 2003/0161303 A1 | 8/2003 | Mehrvar et al. |
| 2003/0161337 A1 | 8/2003 | Weinman |
| 2003/0196012 A1 | 10/2003 | Wolrich et al. |
| 2003/0210574 A1 | 11/2003 | Wolrich et al. |
| 2003/0231635 A1 | 12/2003 | Kalkunte et al. |
| 2004/0039895 A1 | 2/2004 | Wolrich et al. |
| 2004/0054880 A1 | 3/2004 | Bernstein et al. |
| 2004/0059828 A1 | 3/2004 | Hooper et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0085901 A1 | 5/2004 | Hooper et al. |
| 2004/0098496 A1 | 5/2004 | Wolrich et al. |
| 2004/0109369 A1 | 6/2004 | Wolrich et al. |
| 2004/0148382 A1 | 7/2004 | Narad et al. |
| 2004/0162933 A1 | 8/2004 | Adiletta et al. |
| 2004/0252686 A1 | 12/2004 | Hooper et al. |
| 2005/0033884 A1 | 2/2005 | Wolrich et al. |
| 2005/0149665 A1 | 7/2005 | Wolrich et al. |
| 2006/0007871 A1 | 1/2006 | Welin |
| 2006/0069882 A1 | 3/2006 | Wheeler et al. |
| 2006/0156303 A1 | 7/2006 | Hooper et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 773 648 | 5/1997 |
| EP | 0 809 180 | 11/1997 |
| EP | 0 959 602 | 11/1999 |
| JP | 59-111533 | 6/1984 |
| WO | WO 94/15287 | 7/1994 |
| WO | WO 97/38372 | 10/1997 |
| WO | WO 98/20647 | 5/1998 |
| WO | WO 00/38376 | 6/2000 |
| WO | WO 00/56024 | 9/2000 |
| WO | WO 01/16718 | 3/2001 |
| WO | WO 01/16769 | 3/2001 |
| WO | WO 01/16770 | 3/2001 |
| WO | WO 01/16782 | 3/2001 |
| WO | WO 01/17179 | 3/2001 |
| WO | WO 01/31856 | 5/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO03/030461 | 4/2003 |

OTHER PUBLICATIONS

"Enterprise Hardware, Intel Expected to Unveil New Networking Chip," News.Com, Aug. 26, 1999, <http://new.com.com/Intel+expected+to+unveil+new+networking+chip/2100-1001_3-230315.html> (accessed on Aug. 23, 2005), p. 1-5.

"The ATM Forum Technical Committee Traffic Management Specification Version 4.1", The ATM Forum (Mar. 1999).

Agarwal et al., "April: A Processor Architecture for Multiprocessing," Proceedings of the 17th Annual International Symposium on Computer Architecture, *IEEE*, pp. 104-114, (1990).

Beckerle, M.J., "Overview of the START (*T) multithreaded computer" (abstract only), Publication Date: Feb. 22-26, 1993.

Byrd et al., "Multithread Processor Architectures," *IEEE Spectrum*, 32(8):38-46, New York, Aug. 1995.

Chandranmenon, G.P., et al., "Trading Packet Headers for Packet Processing", *IEEE/ACM Transactions on Networking*, 4(2):141-152, Apr. 1996.

Chappell, et al., "Simultaneous Subordinate Microthreading (SSMT)", IEEE, p. 186-195 (1999).

*Dictionary of Computer Words: An A to Z Guide to Today's Computers, Revised Edition*, Houghton Mifflin Company: Boston, Massachusetts, pp. 220, (1995).

*Digital Semiconductor 21140A PCI Fast Ethernet LAN Controller, Hardware Reference Manual*, Digital Equipment Corporation, pp. i-x, 1-1 through 1-5, 2-1 through 2-12, 3-1 through 3-38, 4-31 through 5-2, 6-1 through 6-24, (Mar. 1998).

Doyle et al., *Microsoft Press Computer Dictionary*, 2$^{nd}$ ed., Microsoft Press, Redmond, Washington, USA, p. 326, (1994).

Farrens, et al., "Strategies for Achieving Improved Processor Throughput", *ACM*, p. 362-369 (1991).

Fillo et al., "The M-Machine Multicomputer," *IEEE Proceedings of MICRO-28*, pp. 146-156, (1995).

Frazier, Howard, "Gigabit Ethernet: From 100 to 1,000 Mbps", *IEEE Internet Computing*, pp. 24-31, (1999).

Frazier, Howard, "The 802.3z Gigabit Ethernet Standard", *IEEE Network*, pp. 6-7, (1998).

Giroux, N., et al., "Queuing and Scheduling: Quality of Service in ATM Networks, Chapter 5", *Quality of Service in ATM Networks: State-of-the-Art Traffic Management*, pp. 96-121 (1998).

Gomez et al., "Efficient Multithreaded User-Space Transport for Network Computing: Design and Test of the TRAP Protocol," *Journal of Parallel and Distributed Computing*, Academic Press, Duluth, Minnesota, USA, 40(1):103-117, Jan. 1997.

Govind, et al., "Performance modeling and architecture exploration of network processors", *Quantitative Evaluation of Systems*, abstract only (1 page), Sep. 2005.

Haug et al., "Reconfigurable hardware as shared resource for parallel threads," *IEEE Symposium on FPGAs for Custom Computing Machines*, 2 pages, (1998).

Hauser et al., "Garp: a MIPS processor with a reconfigurable coprocessor," *Proceedings of the 5th Annual IEEE Symposium on Field-Programmable Custom Computing Machines*, pp. 12-21, (1997).

Hyde, R., "Overview of Memory Management," *Byte*, 13(4):219-225, (1988).

Ippoliti, A., et al., "Parallel Media Access Controller for Packet Communications at Gb/s Rates", *IEEE*, pp. 991-996, (1990).

Jenks, S., et al., "Nomadic Threads: A migrating multithread approach to remote memory accesses in multiprocessors" (abstract only), Publication Date: Oct. 20-23, 1996.

Kaiserswerth, M., "The Parallel Protocol Engine", *IEEE/ACM Transactions on Networking*, 1(6):650-663, Dec. 1993.

Khailany, B., et al., "Imagine: Media Processing with Streams," IEEE Micro, Mar.-Apr. 2001, pp. 35-46.

Leon-Garcia, A., *Communcation Networks: Fundamental Concepts and Key Architectures*, McGraw-Hill Higher Education, Copyright 2000, pp. 195-198, 215-219, & 380-385.

Lim, A., et al., "Improving Performance of Adaptive Media Access Control Protocols for High-Density Wireless Networks", *Proceedings of the 1999 International Symposium on Parallel Architectures, Algorithms and Networks (ISPAN '99)*, pp. 316-321, Jun. 1999.

Litch et al., "StrongARMing Portable Communications," *IEEE Micro*, 18(2):48-55, Mar. 1998.

Mollenauer, J.F., et al., "An Efficient Media Access Control Protocol for Broadband Wireless Access Systems", *IEEE Standard, IEEE 802.16 Broadband Wireless Access Working Group*, 19 pages, Oct. 1999.

Ocheltree, K.B., et al., "A comparison of fibre channel and 802 MAC services", *Proceedings of 18th Conference on Local Computer Networks*, abstract only, 1 page, Sep. 1993.

Schmidt et al., "The Performance of Alternative Threading Architectures for Parallel Communication Subsystems," Internet Document, *Online!*, Nov. 13, 1998, pp. 1-19.

Shaw, M.C., et al., *UNIX Internals: A Systems Operations Handbook*, Windcrest Books, pp. 30-37, 1987.

Thistle et al., "A Processor Architecture for Horizon," *IEEE Proc. Supercomputing '88*, pp. 35-41, Nov. 1988.

Todorova, P., et al., "Quality-of-Service-Oriented Media Access Control for Advanced Mobile Multimedia Satellite Systems", *Proceedings of the 36th Annual Hawaii International Conference on System Sciences (HICSS'03)*, 8 pages, Jan. 2003.

Tremblay et al., "A Three Dimensional Register File for Superscalar Processors," *IEEE Proceedings of the 28th Annual Hawaii International Conference on System Sciences*, pp. 191-201, (1995).

Trimberger et al, "A time-multiplexed FPGA," *Proceedings of the 5th Annual IEEE Symposium on Field-Programmable Custom Computing Machines*, pp. 22-28, (1997).

Turner et al., "Design of a High Performance Active Router," Internet Document, *Online!*, 20 pages, Mar. 18, 1999.

Vibhatavanij et al., "Simultaneous Multithreading-Based Routers," *Proceedings of the 2000 International Conference of Parallel Processing*, Toronto, Ontario, Canada, Aug. 21-24, 2000, pp. 362-369.

Vuppala, V., et al., "Layer-3 switching using virtual network ports", *IEEE Proc. Computer Communications and Networks*, pp. 642-648, 1999.

Wazlowski et al., "PRSIM-II computer and architecture," *IEEE Proceedings, Workshop on FPGAs for Custom Computing Machines*, pp. 9-16, (1993).

Wikipedia entry, "Media Access Control", retrieved from http://en.wikipedia.org/wiki/Media_access_control, 2 pages, Jul. 31, 2007.

U.S. Appl. No. 09/473,571, filed Dec. 28, 1999, Wolrich et al.

U.S. Appl. No. 09/475,614, filed Dec. 30, 1999, Wolrich et al.

\* cited by examiner

MULTIPLE CALENDAR SCHEDULE RESERVATION STRUCTURE AND METHOD

TECHNICAL FIELD

This description relates to computer networking, and more particularly to scheduling transmission of network cells.

BACKGROUND

In ATM networking, cells are transmitted over virtual connections. Virtual connections represent stateful communication setups such as an ATM virtual circuit or an Internet TCP connection. At each end of the network virtual connection is a software application that can send and receive messages. The messages are carried across the network as packets or frames that are further subdivided into 48 byte ATM cells. The interface in and out of the forwarding device is either 48 byte ATM cells or 64 byte frame segments. Each virtual connection has a quality of service or rate specification. ATM Forum Traffic Management Specification 4.1 specifies the types of rates, e.g. constant bit rate (CBR), variable bit rate (VBR), unspecified bit rate (UBR), etc. Unspecified bit rate can have a priority associated with the virtual connection.

Network devices such as routers, switches, and traffic shapers schedule the transmission of cells to a network. One form of schedule for transmission is the calendar schedule, where a slot of the schedule represents a period of time for possible transmission of one or more cells. A virtual connection is "scheduled" according to a calendar schedule if a slot in the calendar schedule is reserved for the virtual connection. A transmission process performs the transmissions of the network device. The transmission process uses the calendar schedule as a guide for when to offer transmission opportunities to scheduled virtual connections.

Groups of virtual connections may be scheduled for transmission to one region of a network, going through a network interface such as a port. A large traffic shaper may handle many schedules. For example, each schedule may be for a different port or network domain.

DESCRIPTION OF DRAWINGS

Like reference symbols in the various drawings indicate like elements.

DETAILED DESCRIPTION

In general, for a virtual connection associated with a schedule, a reservation system includes reservation procedures that find an available slot within the schedule. The reservation procedures find the available slot subject to timing requirements imposed by the rate of the virtual connection, when such requirements exists. The reservation system also includes a hierarchical reservation vector whose structure supports efficient lookups of first available slots by the reservation procedures. The reservation procedures are encoded as computing instructions that are executable by one or more automated processors.

Figure 1:
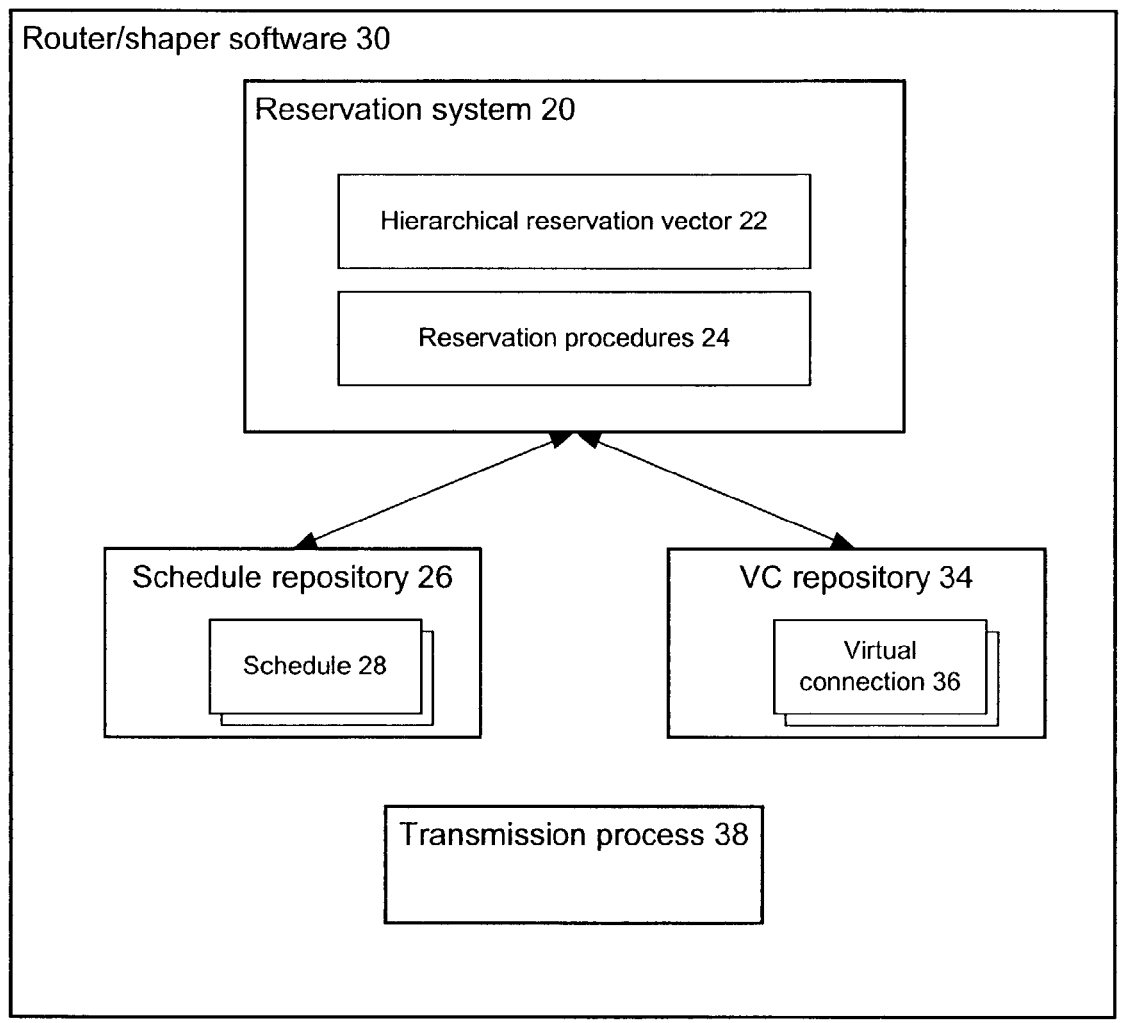
FIG. 1 is a block diagram of logical elements in a reservation system.

Referring to FIG. 1, a reservation system 20 includes hierarchical reservation vector 22 and reservations procedures 24. Hierarchical reservation vector 22 is a data structure.

Reservation system 20 uses a schedule repository 26 that provides information on schedules 28, including the timing and boundaries of each such schedule 28.

Reservation system 20 also uses a virtual connection (or "VC") repository 34. VC repository 34 provides information on virtual connections 36 whose transmission opportunities are governed by schedules 28 in schedule repository 26. VC repository 34 provides information including the rate and affiliated schedule 28 for each virtual connection 36.

Broadly, reservation system 20 manages transmission opportunities for virtual connections 36 according to multiple schedules 28. A transmission process 38 uses reservation system 20 to determine when to offer a transmission opportunity to a given virtual connection 36.

Reservation system 20, schedule repository 26, VC repository 34, and transmission process 38 are component software processes of routing/shaping software 30. In general, routing/shaping software 30 includes software processes that control the operation of a router/traffic shaper 40 (shown in FIG. 2).

The inner workings of transmission process 38 are beyond the scope of the description. Transmission process 38 is a software process that controls transmissions of network traffic by router/traffic shaper (to be discussed below).

Figure 2:
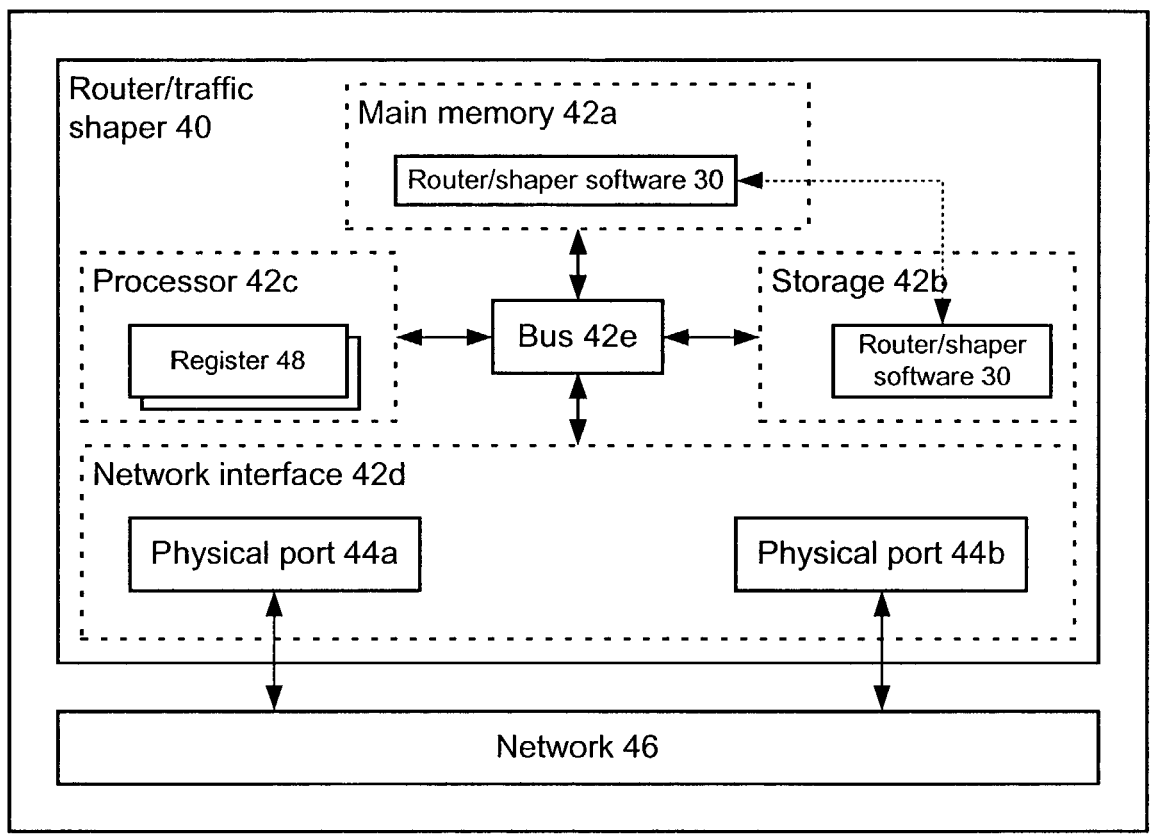
FIG. 2 is a block diagram of a router/traffic shaper.

Referring to FIG. 2, a router/traffic shaper 40 is a networking device. Router/traffic shaper 40 includes components such as main memory 42a, storage 42b, one or more processors 42c, network interface 42d, and bus 42e interconnecting components 42a-d. Main memory 42a and storage 42b store computing instructions and data readable by a processor 42c. Main memory 42a is random-access memory. Storage 42b is non-volatile storage such as a disk drive, programmable memory, writable media, or non-writable media. Processor 42c can access and transfer computing instructions, such as router/shaper software (Item 30, FIG. 1), between main memory 42a and storage 42b. Furthermore, processor 42c, which contains multiple registers 48, executes computing instructions of router/shaper software (Item 30, FIG. 1).

In the present embodiment, router/traffic shaper 40 is a networking device conforming to architecture standards for the Intel IXP series of network processors, manufactured by Intel Corporation, Santa Clara, Calif. In this case, processor 42c is an Intel IXP 1200, and registers 48 each hold 32 bits.

Network interface 42d includes physical ports 44a and 44b, which carry communication between network interface 42d and a network 46. Network interface 42d provides logical access to physical ports 44. Transmission process 38 controls transmissions of network traffic by router/traffic shaper 40 onto network 46.

In the Intel IXP1200 architecture, bit addressing is conventional, i.e., the least significant bit of a byte is rightmost. Byte addressing is little-endian, i.e., less significant bytes have lower addresses.

Figure 3A:
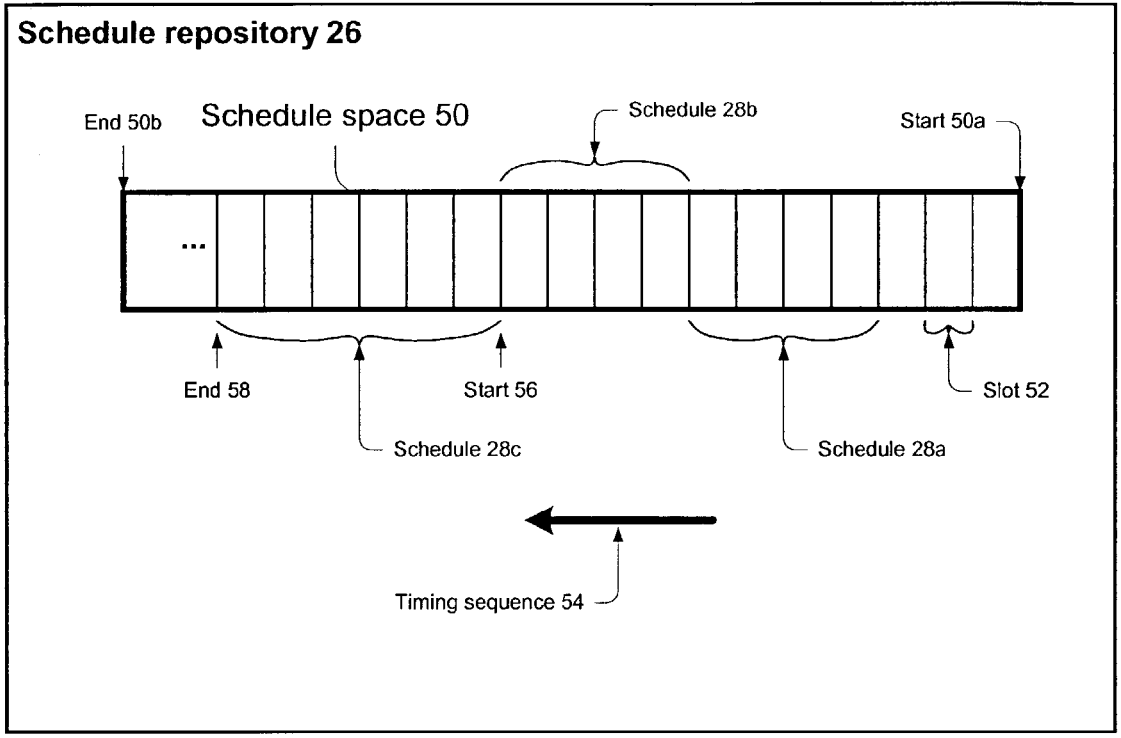
FIG. 3A is a block diagram of a schedule repository.

Referring now to FIG. 3A, schedule repository 26 is a source of information on schedules (Item 28, FIG. 1). Schedule repository 26 includes a schedule space 50, which is divided into 64K (i.e., two to the sixteenth power) slots 52. A slot 52 represents a unit of time for possible transmission of a cell. Slots 52 can be reserved for use by virtual connections (Item 36, FIG. 1) as will be described. Slots 52 are sequenced relative to one another in schedule space 50 according to a timing sequence 54. Schedule space 50 has a schedule space start 50a and a schedule space end 50b which correspond to its first and last slots 52, respectively.

Schedule space 50 includes one or more schedules 28a, 28b, 28c. There can be many hundreds of schedules 28a, 28b, 28c in schedule space 50. In general, a schedule 28a, 28b, 28c describes when to transmit cells to a network. The transmissions described by a schedule 28a, 28b, 28c can have local or remote origins, relative to router/traffic shaper (Item 40, FIG. 2). That is, a schedule 28a, 28b, 28c can govern the local behavior of the router/traffic shaper 40 in its capacity as a store-and-forward network device on network 46. Alternatively, a schedule 28a, 28b, 28c can govern transmissions in other devices or systems than router/traffic shaper (Item 40, FIG. 2). For instance, router/traffic shaper (Item 40, FIG. 2) could manage schedules 28a, 28b, 28c for other devices or systems accessible via network (Item 46, FIG. 2) each for a different port, network domain, or the like.

Each schedule 28a, 28b, 28c is encoded in schedule space 50 as a contiguous block of slots 52 in schedule space 50. Schedules 28a, 28b, 28c therefore represents a block of time that is divided into slots 52. Each schedule 28a, 28b, 28c has a schedule start 56 and a schedule end 58 which correspond to its first and last slots 52, respectively.

Figure 3B:
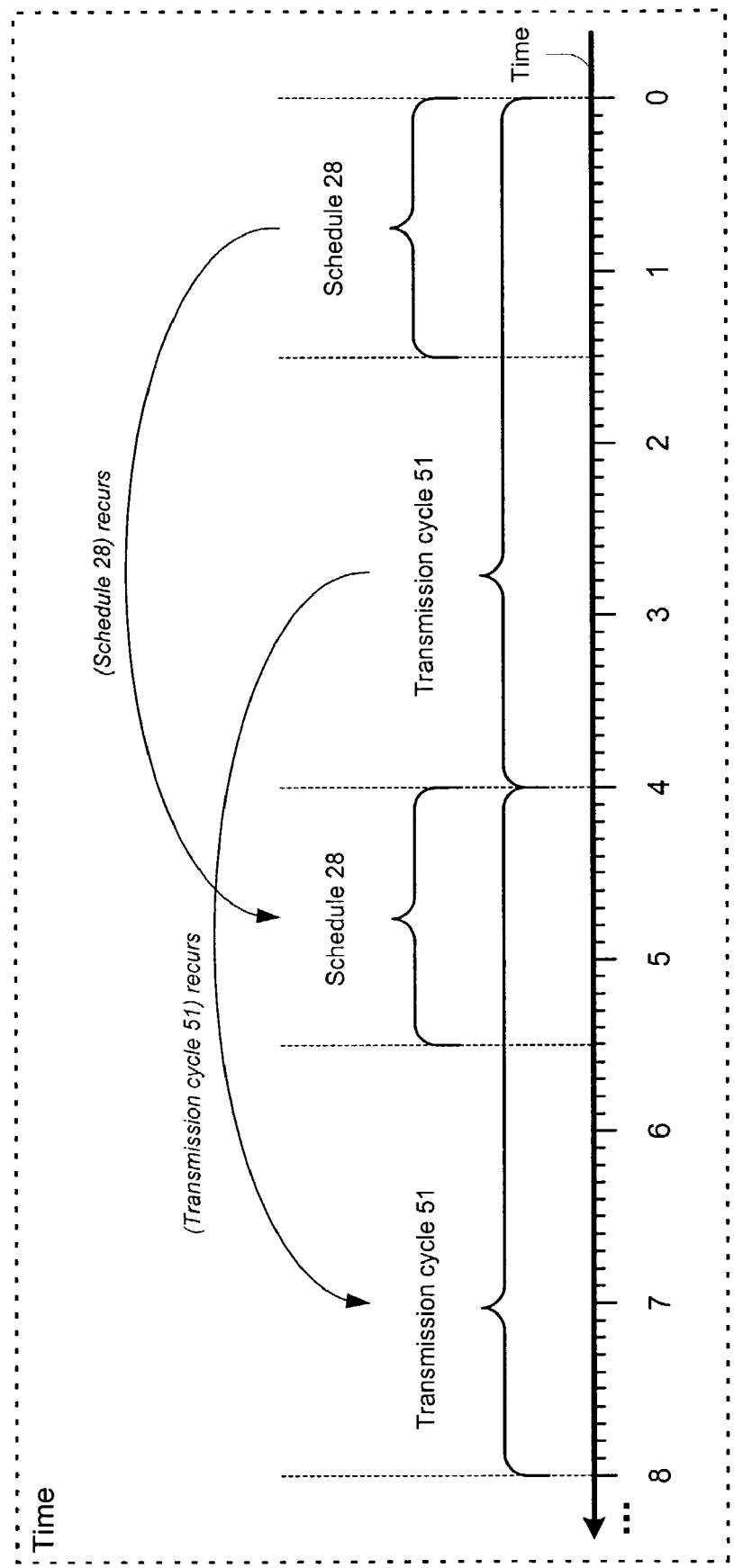
FIG. 3B is a diagram of a recurrent transmission cycle.

Referring now to FIG. 3B, schedule space (Item 50, FIG. 3a) describes a finite amount of time divided into schedule slots (Item 52, FIG. 3a). The amount corresponds to a transmission cycle 51 that repeats with a regular period in time. Typically, the transmission cycle describes a window of transmission choices made by a transmission process (Item 38, FIG. 1) of router/traffic shaper (Item 40, FIG. 2).

Periodic repetition maps the transmission cycle 51 forward in time. Repetition creates a correspondence between a finite amount of time (corresponding to a transmission cycle) and an arbitrarily large amount of time (corresponding to the future transmission choices of transmission process; item 38, FIG. 1). In particular, any future transmission choice corresponds to some unique iteration of the transmission cycle.

Furthermore, transmission cycle repeats with a regular period. The timing of events governed by schedule space (Item 50, FIG. 3a) is therefore predictable, at least until the configuration of schedule space (Item 50, FIG. 3a) changes.

Figure 4:
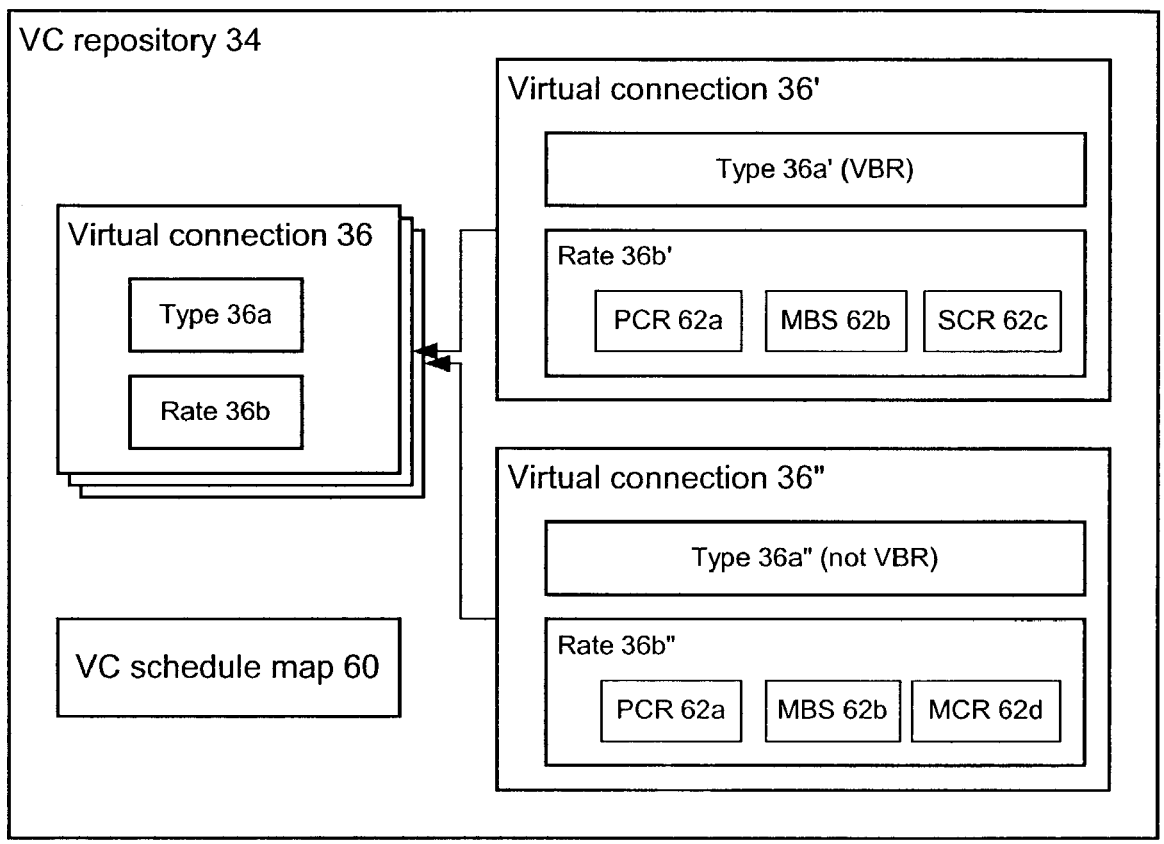
FIG. 4 is a block diagram of a virtual connection repository.

Referring now to FIG. 4, VC repository 34 is a source of virtual connection information. VC repository 34 includes a VC schedule map 60 and collection of virtual connections 36.

A virtual connection 36 includes a type 36a and rate information 36b. Type 36a can adopt values consistent with ATM Forum Traffic Management Specification 4.1. For instance, acceptable values for type 36a include constant bit rate (CBR), variable bit rate (VBR), and unspecified bit rate (UBR).

In general, rate information 36b describes traffic parameters for virtual connection 36, such as for quality-of-service contracts or bandwidth allocations. Rate information 36b includes fields for PCR ("peak cell rate") 62a and MBS ("maximum burst size") 62b. PCR 62a describes a maximum data rate at which virtual connection 36 is specified to operate, measured as an average over time. MBS 62b describes the maximum number of sequential cells that can be sent at PCR 62a on virtual connection 36 instantaneously (or within a small window of instantaneously, relative to the measurement of PCR 62a).

Some types of rate information 36b depend on the value of type 36a. For example, virtual connections 36 with a VBR value for type 36a include a field for sustained cell rate (SCR) 62c. SCR 62c describes a minimum data rate at which virtual connection 36 is specified to operate, measured as an average over time. Alternatively, a virtual connection 36 with a non-VBR value for type 36a can include a minimum cell rate (MCR) 62d. A third possibility is a UBR virtual connection 36 that has a zero-valued MCR 62d, indicating that there is no minimum rate associated with them.

VC schedule map 60 associates virtual connections 36 with schedules 28.

Broadly speaking, a hierarchical reservation vector (to be discussed below) is a data structure that tracks whether slots (Item 52, FIG. 3a) in schedule space (Item 50, FIG. 3a) are reserved, i.e., have transmission commitments to a virtual connection 36.

Figure 5A:
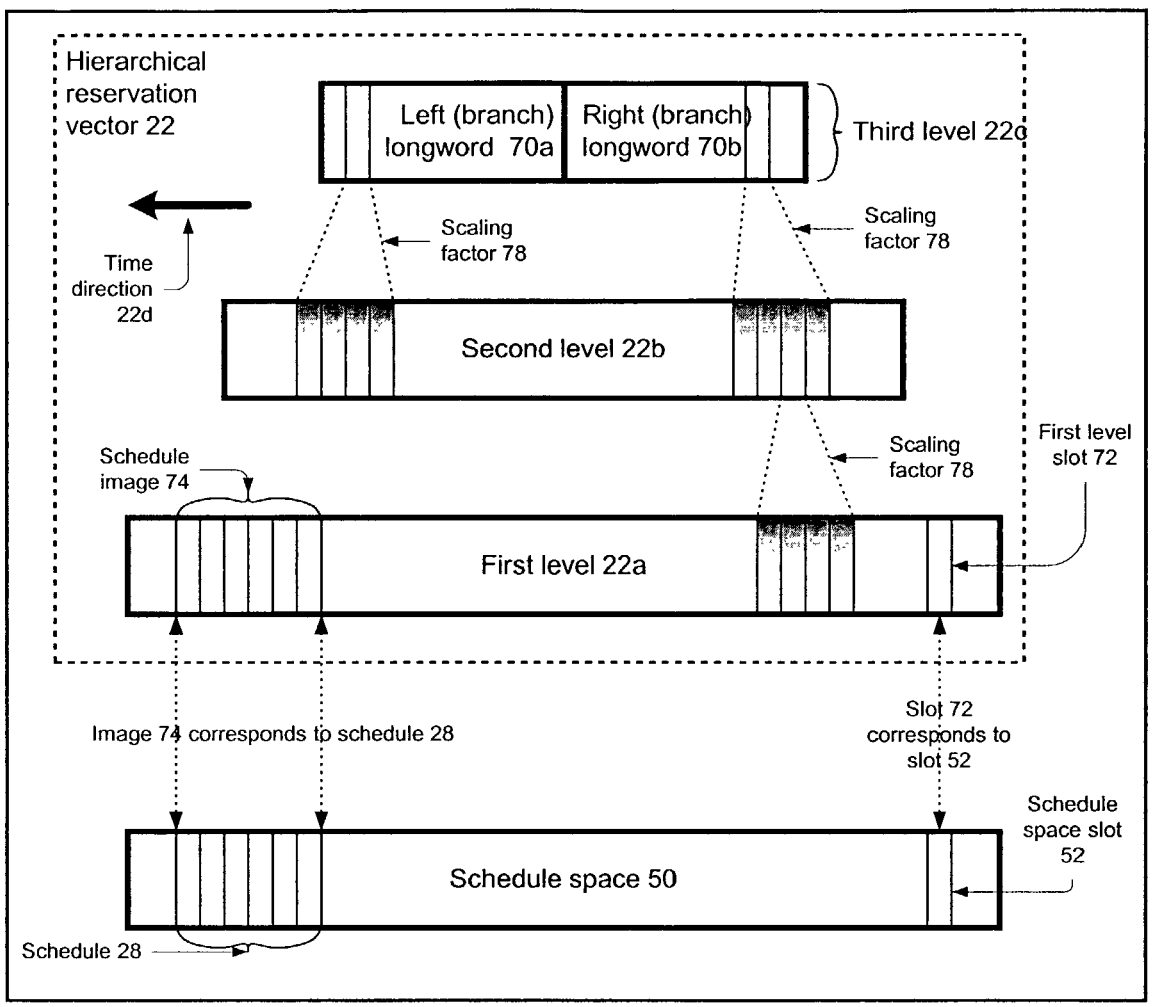
FIG. 5A is a diagram of a hierarchical reservation vector.
Figure 5B:
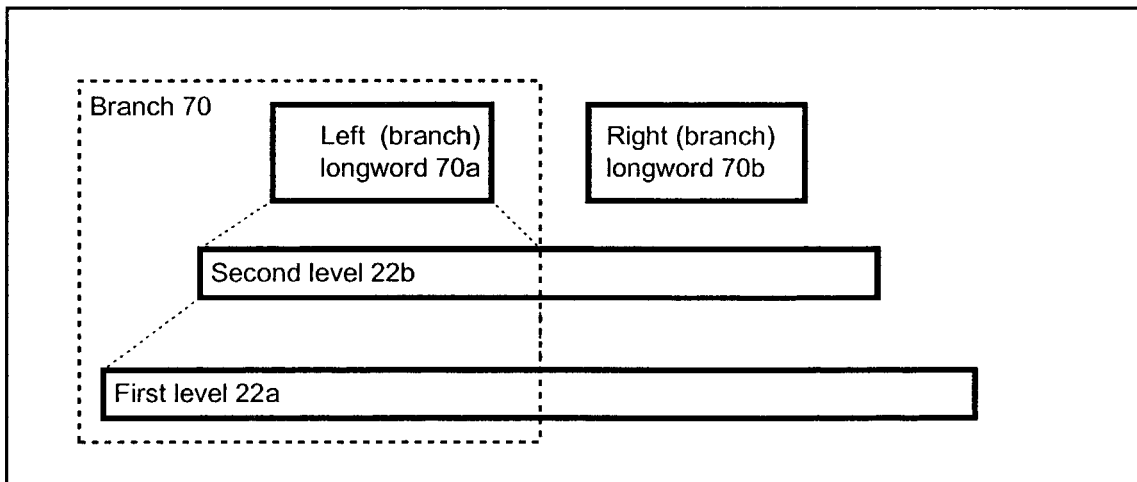
FIG. 5B is a diagram of a branch of a hierarchical reservation vector.

Referring now to FIGS. 5A & 5B, a hierarchical reservation vector 22 includes a first level 22a, a second level 22b, and a third level 22c. In the present embodiment, third level 22c includes a left longword 70a and a right longword 70b. Hierarchical reservation vector 22 also features a time direction 22d, which organizes first level slots 72 into a sequence corresponding to their relative positions in time within the transmission cycle of schedule space.

First level 22a is a bit vector organized to correspond to schedule space 50. First level 22a includes first level slots 72, each of which is encoded as a bit that uniquely corresponds to a schedule space slot 52 in schedule space 50. First level 22a has as many first level slots 72 as there are schedule space slots 52 in schedule space 50—in this case, 64K. Time direction 22d is an ordering of first level slots 72 that corresponds to timing sequence (Item 54, FIG. 3).

In the present embodiment, time direction 22d simply uses the ordering given by bit addressing in main memory (Item 42a, FIG. 2). Thus, schedule space slots 52 and collections of schedule space slots 52 have corresponding locations in first level 22a. In particular, a given schedule 28 in schedule space 50 corresponds to a schedule image 74 in first level 22a. In this way, schedules 28 are encoded as variable-size arrays (schedule images 74) within hierarchical reservation vector 22.

Second level 22b is a bit vector organized to correspond to first level 22a according to a scaling factor 78. The scaling factor 78 is the number of bits in first level 22a that are represented (or "shadowed") by a single bit in second level 22b. The scaling factor 78 is constant throughout hierarchical reservation vector 22. In the present embodiment, the scaling factor 78 has the value thirty-two. In FIG. 5A, for visual simplicity and clarity, scaling factor 78 is drawn such that the scaling factor 78 is four. The value of thirty-two for scaling factor 78 is based on the word size of processor (Item 42c, FIG. 1), i.e., the number of bits that can fit in register (Item 48, FIG. 2). Each bit in second level 22b corresponds to a full word in first level 22a. Conversely, every bit in first level 22a has one bit in second level 22b that shadows it.

Scaling factor 78 determines the size of second level 22*b* relative to the size of first level 22*a*. Because first level 22*a* has 64K members, second level 22*b* has 2K (i.e., 2048) members.

Third level 22*c* relates to second level 22*b* in much the same way that second level 22*b* relates to first level 22*a*. Each bit in third level 22*c* corresponds to a full word in second level 22*b*, as determined by scaling factor 78. Because first level 22*a* has 2048 members, therefore, second level 22*b* has 64 members. The first half of these is shadowed by left longword 70*a*, while the second half is shadowed by right longword 70*b*.

Reservations are represented in hierarchical reservation vector 22 as follows. A bit off in first level 22*a* (i.e., a value of a slot 72) indicates the corresponding slot 52 is reserved. A bit off in second level 22*b* indicates all of the bits it shadows are off in the next lower level, i.e., all of the corresponding first level slots 72 are reserved. Therefore, a bit on at second level 22*b* indicates at least one of its shadowed first level slots 72 is available. Similarly, a bit off at third level 22*c* indicates all of the bits it shadows are off in lower levels, i.e., 1024 first level slots 72 are reserved. A bit on at third level 22*c* indicates at least one of the 1024 first level slots 72 it represents is available.

Figure 6:
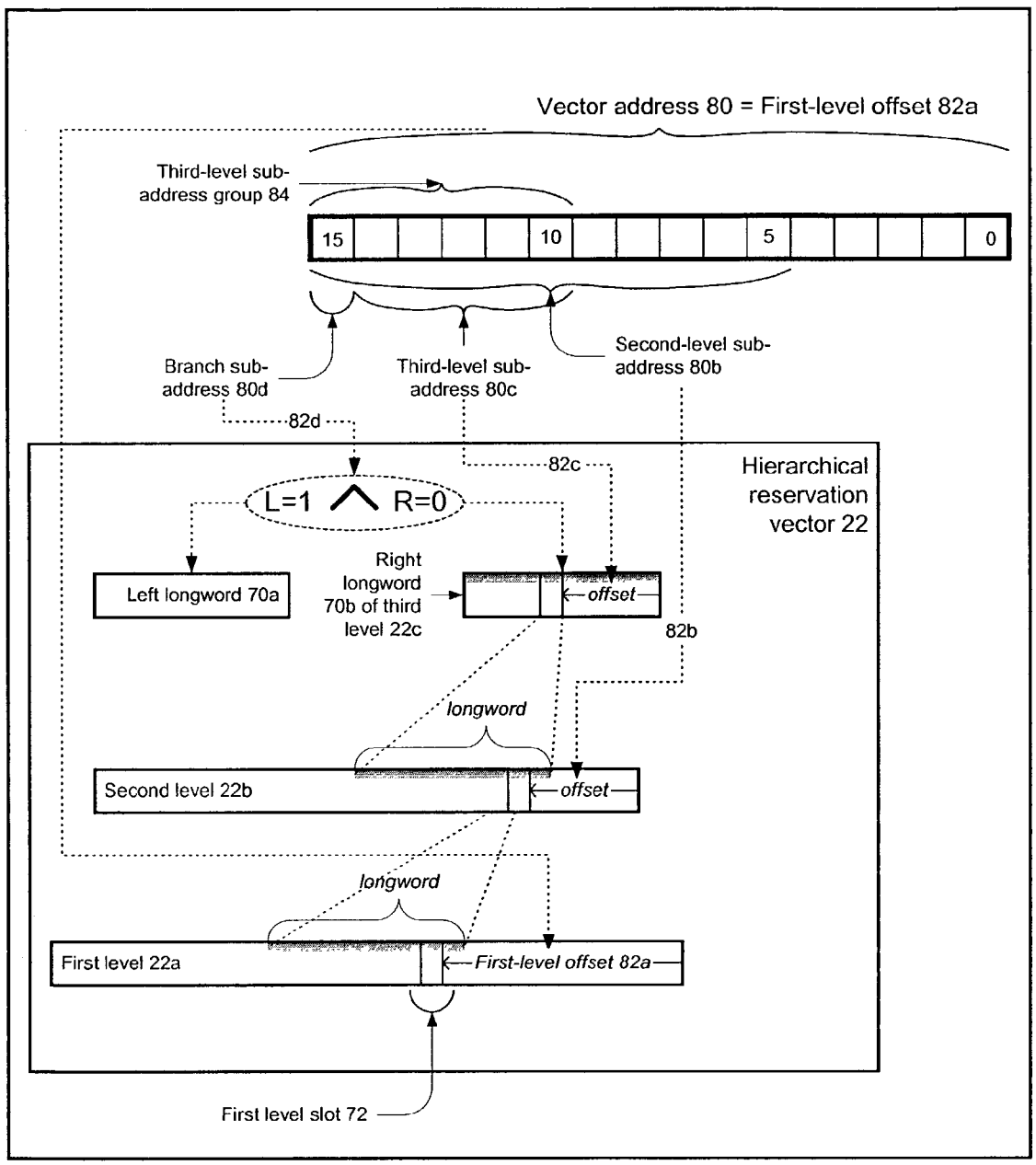
FIG. 6 is a block diagram of a vector address.

Referring now to FIG. 6, a vector address 80 is a 16-bit unsigned binary integer that describes hierarchical reservation vector 22. Vector address 80 describes a bit position of a first level slot 72 within first level 22*a*. Vector address 80 also describes bit positions of shadowing bits in second level 22*b* and third level 22*c*.

The bits of vector address 80 are numbered sequentially from least significant to most significant. Thus, the least significant bit of vector address 80 is numbered zero, and the most significant bit is numbered fifteen.

Vector address 80 is organized into portions that yield offsets 82*a*, 82*b*, 82*c* into levels of hierarchical reservation vector 22, when the portions are evaluated as unsigned binary integers. For example, treated as a 16-bit unsigned binary integer, the entire vector address 80 is an offset into the 64K bits of first level 22*a*, shown as first level offset 80*a*. Conversely, every first level slot 72 has a unique value, representing its offset position in first level 22*a*, that can be represented as a vector address 80.

Vector address 80 includes a second-level sub-address 80*b*, stored in bits five through fifteen of vector address 80. Note that the scaling factor (Item 78, FIG. 5*a*) is such that first level slots 72 are grouped together in groups of thirty-two. Also note that for a given 11-bit prefix on a 16-bit unsigned binary integer (that is, for fixed values of bits five through fifteen) there are precisely thirty-two such integers that have that prefix. (A prefix of length N is the N most significant bits.) Further note that 11 bits is precisely the number of bits necessary to address the 2048 members of second level 22*b*. Vector address 80 takes advantage of these inherent properties of unsigned binary integers to use bits five through fifteen as second-level sub-address 80*b*, describing an offset 82*b* into second level 22*b*. In particular, for a given first level slot 72 having a vector address 80, the offset of its corresponding shadowing bit in second level 22*b* is given by second-level sub-address 80*b*.

Vector address 80 includes a third-level sub-address group 84, stored in the six bits numbered ten through fifteen of vector address 80. Third-level sub-address group 84 is divided into a branch sub-address 80*d* and a third-level sub-address 80*c*. Note that the six bits of third-level sub-address group 84 use several of the same principles of unsigned binary integers that define the value of second-level sub-address 80*b*. A given 6-bit prefix of a 16-bit value is held in common by a group of 1024 distinct values, which is a size that corresponds exactly to the shadowing of 1024 first level slots 72 as already described. Furthermore, the 6-bit prefix also corresponds to a shadowed group when considered only as the prefix of the 11-bit second-level sub-address 80*b*. That is, a given 6-bit prefix is held in common by a group of 32 distinct 11-bit values. Thus, third-level sub-address group 84 could be used as an offset into third level 22*c*, but this is not how vector address 80 is structured in the present embodiment. Instead, third level 22*c* is divided into two 32-bit arrays, namely, left longword 70*a* and right longword 70*b*. Bit fifteen of vector address 80 is used to specify the branch to use, while bits ten through fourteen are used as an offset into the particular array. An advantage of this branched approach is that each of left longword 70*a* and right longword 70*b* can be placed entirely in register 48 of the processor (Item 42*c*, FIG. 2). The fact that an entire array (or a significant portion of one) can be stored in register 48 or processed in native operations of processor 42*c* is beneficial to certain manipulations of hierarchical reservation vector 22. For instance, it is useful if the processor (Item 42*c*, FIG. 2) supports finding the first set bit in a 32-bit array, as will be explained in regards to circular priority find procedure (to be explained below). Thus, for sufficiently small lengths of bit arrays in hierarchical reservation vector 22, addressing the arrays via the branching approach used for third-level sub-address 80*c* may have advantages over the non-branched approach used for second-level sub-address 80*b*.

Figure 7:
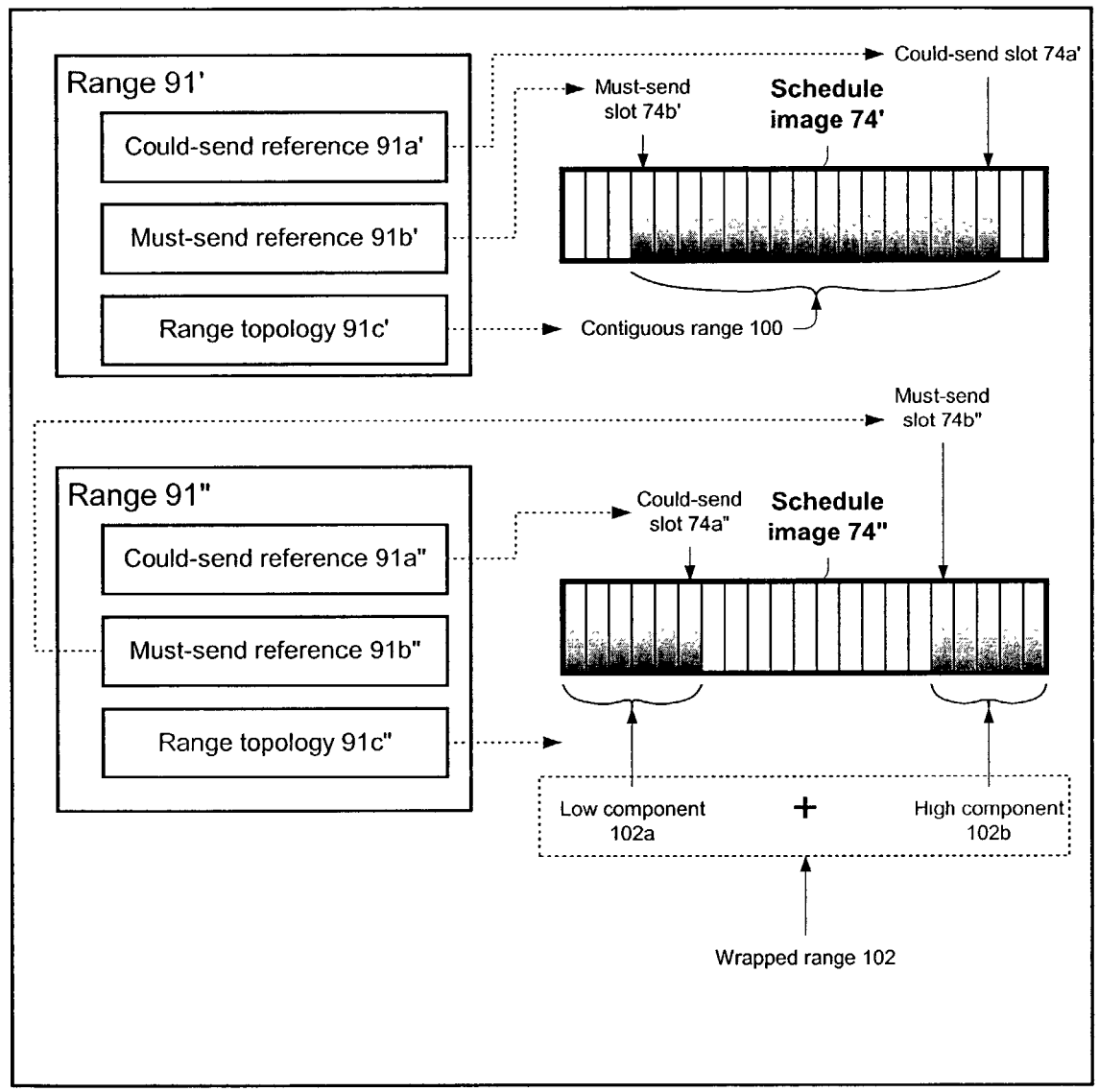
FIG. 7 is a block diagram of a range for virtual connection transmission.

Referring now to FIG. 7, a range 91', 91" associates a virtual connection (Item 36, FIG. 4) with a schedule image 74', 74" in the hierarchical reservation vector (Item 22, FIG. 6). Therefore, a range (e.g., 91') can describe a period of time in which a reservation can be made for the virtual connection (Item 36, FIG. 4) that would satisfy both the traffic parameters of the virtual connection (Item 36, FIG. 4) and the time constraints of a schedule image (e.g., 74').

For example, range 91' includes a could-send reference 91*a*' and a must-send reference 91*b*'. Together, could-send reference 91*a*' and a must-send reference 91*b*' specify one or more contiguous blocks of first level slots (Item 72, FIG. 6) in hierarchical reservation vector (Item 22, FIG. 6), such that the blocks occur within the boundaries of the schedule image 74'.

Could-send reference 91*a*' specifies a could-sent slot 74*a*', while must-send reference 91*b* specifies a must-send slot 74*b*'. The relative position of could-sent slot 74*a*' and must-send slot 74*b*' in schedule image 74' determines at least two possible values for a range topology 91*c*'. When could-sent slot 74*a*' occurs before must-send slot 74*b*' with regards to time direction (Item 22*d*, FIG. 5*a*) of hierarchical reservation vector (Item 22, FIG. 5*a*), topology 91*c*, has a contiguous range 100.

Alternatively, for example, when could-sent slot 74*a*" occurs after must-send slot 74*b*", topology 91*c*" has a wrapped range 102.

In schedule image 74', contiguous range 100 is a contiguous block of slots, which begins with could-send slot 74*a*' and ends with must-send slot 74*b*'.

For schedule image 74", wrapped range 102 includes a high component 102*b* and a low component 102*a*, each of which is a contiguous block of slots in schedule image 74". Low component 102*a* begins with could-send slot 74*a*" and ends with the last slot of schedule image 74". Low component 102*a* represents an earlier time than high component 102*b*, due to the wrap. High component 102*b* begins with the first slot of schedule image 74" and ends with must-send slot 74b". Conceptually, wrapped range 102 begins with could-send slot 74a", continues uninterrupted to the last slot of schedule image 74", wraps to the first slot of schedule image 74", and ends with must-send slot 74b". This conceptual wrapping of wrapped range 102 reflects the cyclical structure of schedules (Item 28, FIG. 1) and their corresponding schedule images (e.g., 74).

Reservation system 20 includes reservation procedures 24 (to be discussed below). Broadly speaking, reservation procedures maintain and inspect schedule information stored in hierarchical reservation vector (Item 22, FIG. 6). For instance, various reservation procedures set, clear, and detect slot reservations in the schedule space (Item 50, FIG. 3a) as it is represented in hierarchical reservation vector (Item 22, FIG. 6).

Figure 8:
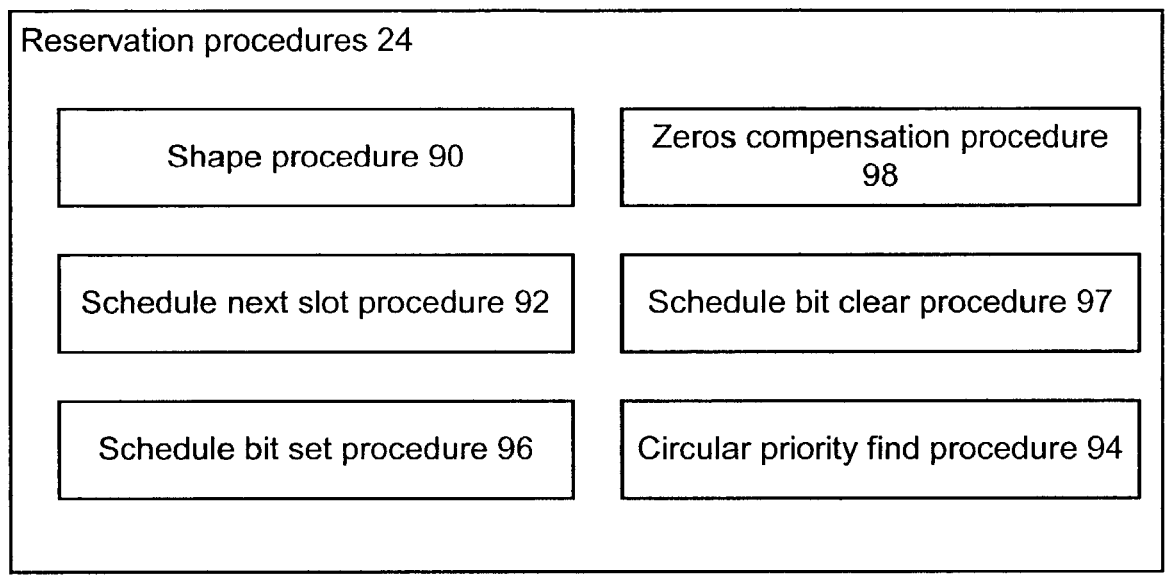
FIG. 8 is a block diagram of reservation procedures.

Referring now to FIG. 8, reservation procedures 24 include a shape procedure 90, a schedule next slot procedure 92, a circular priority find procedure 94, a zeroes-compensation procedure 98, a schedule bit set procedure 96, and a schedule bit clear procedure 97.

Broadly, shape procedure 90 determines a range (e.g., range 91", FIG. 7) for a given virtual connection (Item 36, FIG. 1) associated with a schedule (Item 28, FIG. 1). Given a virtual connection (Item 36, FIG. 1) having traffic parameters, shape procedure 90 calculates a could-send time, which is the earliest time the next cell can be sent according to the traffic parameters. Shape procedure 90 also calculates a must-send time, which is the latest time the next cell can be sent according to the traffic parameters. Shape procedure 90 correlates these times to slots (Item 72, FIG. 6) in the hierarchical reservation vector (Item 22, FIG. 6).

Figure 9:
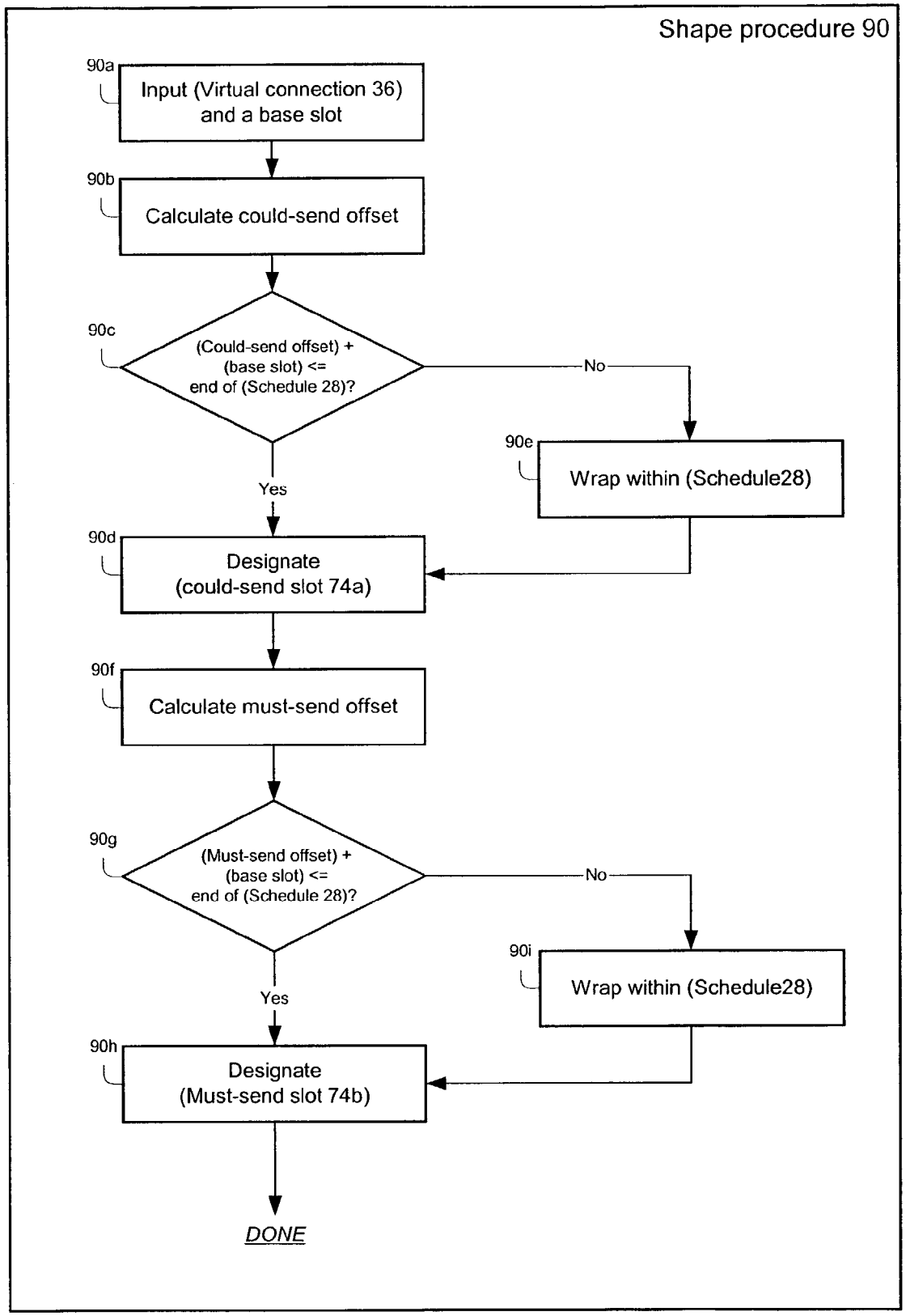
FIG. 9 is a flowchart of a shape procedure.

Referring now to FIG. 9, shape procedure 90 receives as input a virtual connection and a base slot index (i.e., process 90a). Virtual connection is associated with a schedule, in that schedule has a schedule image in hierarchical reservation vector. The base slot index references a first-level slot that corresponds to current absolute time, i.e., the time at which the shape procedure 90 is executing.

Shape procedure 90 examines the rate of virtual connection to determine a maximum permissible current transmission speed, then expresses this speed as a could-send offset (i.e., process 90b). The could-send offset is a count of first-level slots. Maximum permissible current transmission speed is calculated based on the current state of virtual connection and its traffic parameters. Generally, the maximum permissible current transmission speed is the lesser of an overall maximum, given by PCR, and a situational maximum based on burst size, given by MBS.

Shape procedure 90 tests whether the could-send offset added to the base slot index yields a slot before the end of the current schedule (i.e., process 90c). If the test is positive, shape procedure 90 designates that slot as the could-send slot (i.e., process 90d). If the test is negative, shape procedure wraps the offset to the corresponding slot within schedule (i.e., process 90e), then designates the wrapped slot as the could-send slot (i.e., process 90d).

Shape procedure 90 also examines the rate of virtual connection to determine a minimum permissible current transmission speed, expressing this speed as a must-send offset (i.e., process 90f). The must-send offset is a count of first-level slots. Minimum permissible current transmission speed is calculated based on the type and traffic parameters of virtual connection. For instance, for a VBR virtual connection, the calculation uses SCR (Item 62c, FIG. 4). Alternatively, for a non-VBR virtual connection (Item 36a, FIG. 1) that has a minimum, the calculation uses MCR (Item 62d, FIG. 1).

Shape procedure 90 then tests whether the must-send offset added to the base slot index yields a slot before the end of the current schedule (i.e., process 90g). If the test is positive, shape procedure 90 designates that slot as the must-send slot (i.e., process 90h). If the test is negative, shape procedure 90 wraps the offset to the corresponding slot within schedule and designates the wrapped slot as the must-send slot (i.e., process 90i).

Broadly speaking, unless schedule next slot procedure encounters a failure condition, as will be explained, schedule next slot procedure starts at the highest level of hierarchical reservation vector and repeatedly applies circular priority find procedure at each successive level, until reaching first level and finding a first level slot. The slot, if found, is the first available slot within a given range.

Figure 10:
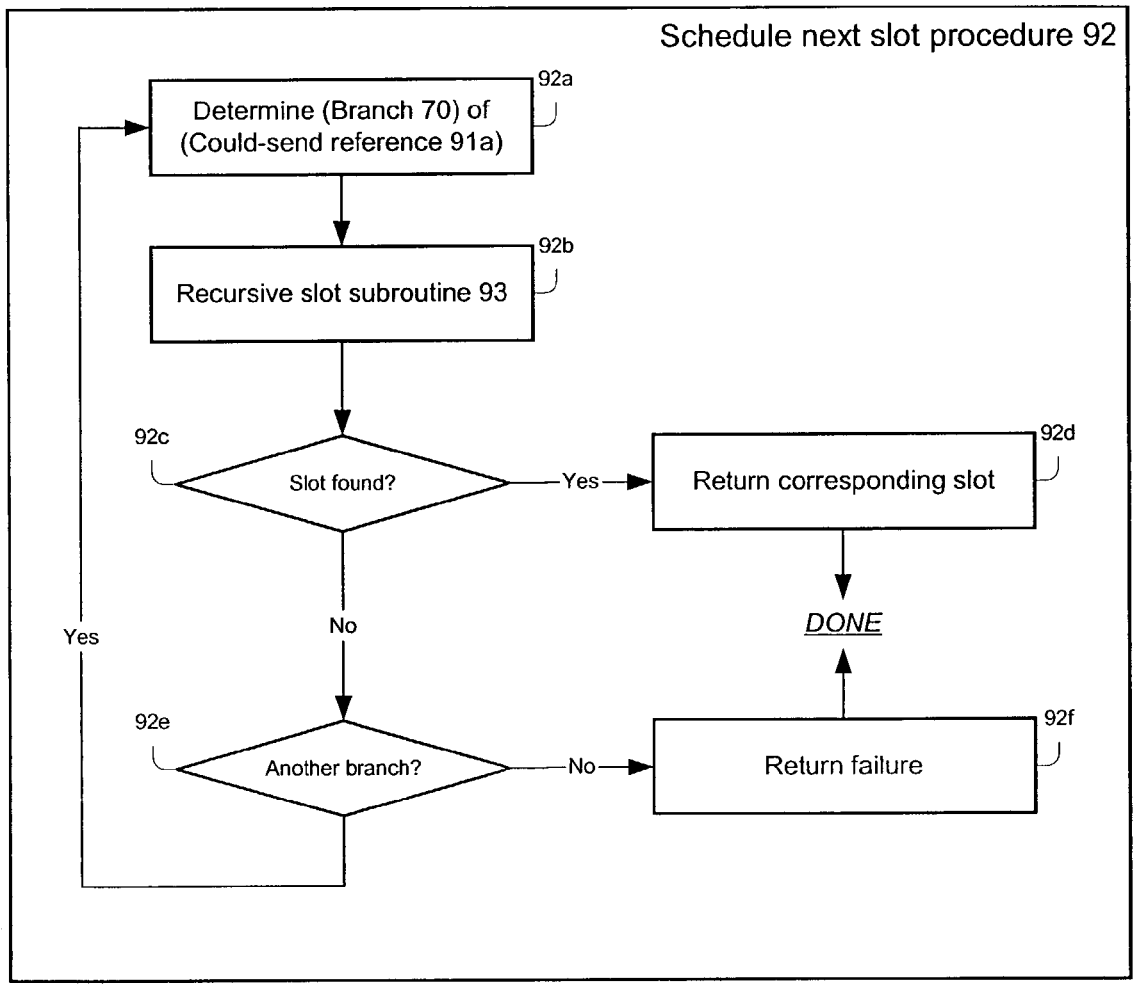
FIG. 10 is a flowchart of a schedule next slot procedure.

Referring now to FIG. 10, schedule next slot procedure 92 first determines which branch (e.g., items 70a and 70b, FIG. 5a) of hierarchical reservation vector (Item 22, FIG. 6) is appropriate to the could-send reference (i.e., procedure 92a). Schedule next slot procedure inspects branch sub-address of the could-send reference, which is a vector address. For example, in the described embodiment, where branch sub-address can be stored in one bit, schedule next slot procedure 92 determines the branch by testing the bit of branch sub-address. If the bit is on, schedule next slot procedure 92 selects the left longword 70a. Otherwise, schedule next slot procedure 92 selects the right longword 70b.

Schedule next slot procedure 92 then invokes recursive slot subroutine (i.e., procedure 92b). Generally, starting from an arbitrary location within a branch, recursive slot subroutine either finds a first available slot subject to a range and a schedule image, or returns a failure result (e.g., if no such slot is available). Schedule next slot procedure 92 provides recursive slot subroutine with the range that schedule next slot procedure received as inputs, and also provides the top level of the branch and a zero offset into that branch.

Schedule next slot procedure 92 next tests the output of recursive slot subroutine (i.e., procedure 92c). If the recursive slot subroutine returns a slot, schedule next slot procedure 92 returns that slot as a result value (i.e., procedure 92d). Otherwise, schedule next slot procedure 92 tests whether the given range spans a subsequent branch (i.e., procedure 92e). If such a spanning exists, schedule next slot procedure 92 loops back to select the next branch, according to the ordering given by time direction and the range topology (i.e., procedure 92a). Thus, schedule next slot procedure 92 continues evaluating branches according to the ordering given by time direction until either the entirety of range has been searched, or an available slot has been found. For a range topology having a contiguous range, the ordering of branches is that given by time direction over contiguous range. For a range topology having a wrapped range however, the ordering of branches has two parts: that given by time direction over high component, followed by the same ordering over low component.

If the test of procedure is negative, schedule next slot procedure 92 returns a result indicating failure (i.e., procedure 92f).

Figure 11:
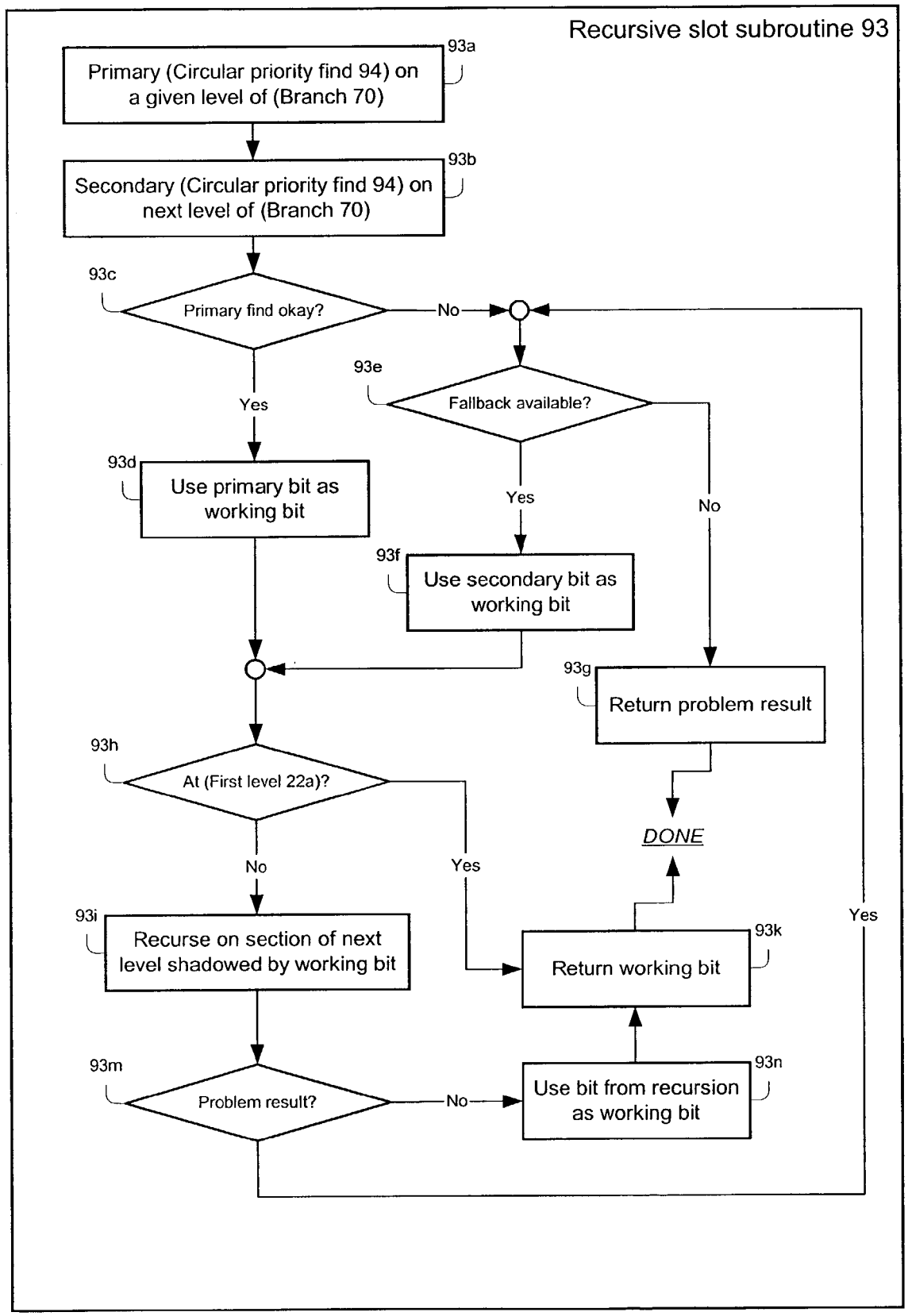
FIG. 11 is a flowchart of a recursive slot subroutine.

Referring now to FIG. 11, recursive slot subroutine 93 takes as input a range, a schedule image, a level of hierarchical reservation vector, and an offset within that level. The offset specifies a unique longword within the given level. Recursive slot subroutine returns a first available slot after the starting point and within the range, or a failure result.

Recursive slot subroutine 93 invokes a primary instance of circular priority find (Item 94, FIG. 8) on the longword specified by the offset (i.e., process 93*a*). As will be explained, circular priority find (Item 94, FIG. 8) returns a first set bit within a longword. This discussion will refer to that bit as the "primary bit". If the level given to recursive slot subroutine 93 is first level, the primary bit represents a slot that is available to be allocated. For higher levels such as second level and above, the primary bit shadows a block of slots, at least one of which is available to be allocated. Moreover, since bits of the longword are ordered according to time direction, the primary bit typically represents a first available allocation opportunity. An exception to this general rule occurs for degenerate cases, as will be explained.

Recursive slot subroutine 93 next invokes a secondary instance of circular priority find on the portion of the longword, if any, that follows the bit position returned by the primary instance of circular priority find (i.e., process 93*b*). The bit returned by the secondary instance of circular priority find, if any, represents a next available allocation opportunity, subsequent to the first. This discussion will refer to that bit as the "secondary bit". Process 93*b* also sets a "fallback flag" to a true/false value, initially indicating whether the secondary bit is available as a fallback alternative to the primary bit.

Recursive slot subroutine 93 tests the result of the primary instance of circular priority find (i.e., process 93*c*). If the primary bit was successfully found, recursive slot subroutine 93 uses the primary bit as a working bit (i.e., process 93*d*). The working bit is a candidate for the bit that recursive slot subroutine 93 will return. Otherwise, if a primary bit was not found, recursive slot subroutine 93 tests the fallback flag (i.e., process 93*e*). If the fallback flag is true, recursive slot subroutine 93 uses the secondary bit as the working bit and sets the fallback flag value to false (i.e., process 93*f*).

If the fallback flag is false, recursive slot subroutine 93 returns a failure result (i.e., process 93*g*).

Following a selection of the working bit, recursive slot subroutine 93 tests whether the current level of hierarchical reservation vector is the first level (i.e., process 93*h*). If the current level is the first level, recursive slot subroutine returns the working bit as a result value representing a slot (i.e., process 93*k*). Otherwise, if the current level is not the first level, an opportunity exists to recurse from the current level to a next level, toward first level, such that the next level includes a longword shadowed by the working bit. If such a next level exists, recursive slot subroutine 93 begins processing the next level at the longword shadowed by the working bit, using the same range as was passed to recursive slot subroutine 93 (i.e., process 93*i*). For example, a current instance of recursive slot subroutine 93 can pass control to a dependent instance of recursive slot subroutine 93, where the dependent instance executes to completion before returning control to the current instance. In general, unless failure conditions occur, this pattern of recursive control-passing repeats until recursive slot subroutine 93 processes a longword at first level. The number of repetitions is therefore bounded by the number of levels between first level and the level passed to the top-level instance of recursive slot subroutine 93.

Process 93*i* can return a problem result, comparable to that returned by recursive slot subroutine 93 itself. In the absence of a problem result, however, process 93*i* continues a recursive chain that eventually reaches first level. Thus, if process 93*i* returns a bit, that bit represents a first-level slot.

Recursive slot subroutine 93 tests the result of process 93*i* via process 93*m*. If a problem result is found, recursive slot subroutine 93 goes to process 93*e* to test the fallback flag and proceeds from there as already described. Otherwise, if no problem result is found, recursive slot subroutine 93 uses the bit returned by process 93*i* as the working bit (i.e., process 93*n*). Recursive slot subroutine 93 then returns the working bit as a result value representing a slot (i.e., process 93*k*).

Circular priority find procedure (Item 94, FIG. 8) takes as inputs a range and a longword of hierarchical reservation vector. Circular priority find procedure (Item 94, FIG. 8) returns a first set bit, or an error if no first set bit exists. In the present embodiment, the first set bit is the least significant bit which is not off and which is in the intersection of the longword and the range.

Figure 12:
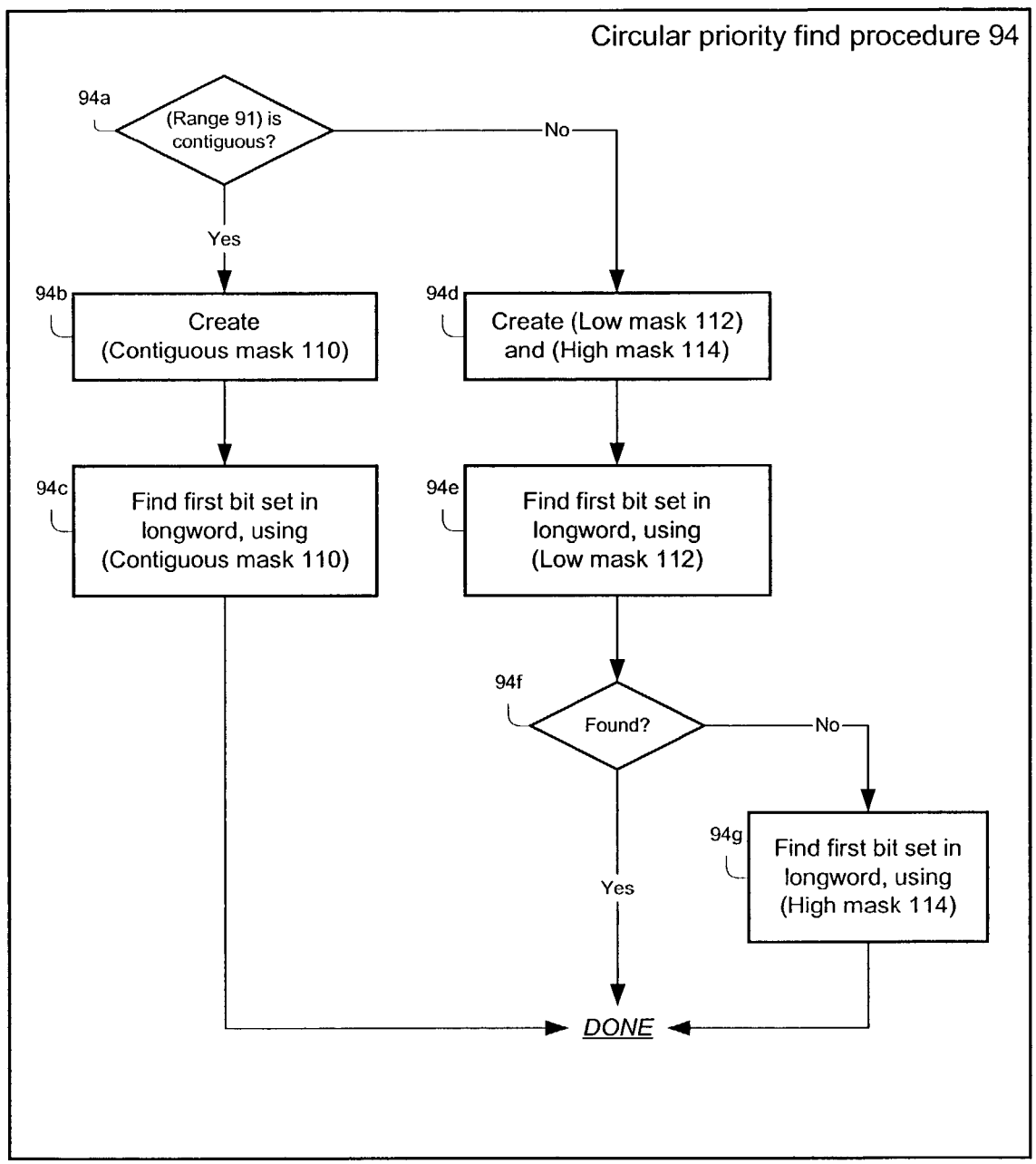
FIG. 12 is a flowchart of a circular priority find procedure.

Referring now to FIG. 12, circular priority find procedure 94 tests whether the given range has a could-send reference which is less than its must-send reference (i.e., process 94*a*). This is equivalent to testing whether the given range has a contiguous range topology. If the range is contiguous, circular priority find procedure 94 creates a contiguous mask (i.e., process 94*b*). Contiguous mask is a bit mask that selects for bits of the longword that correspond to the range topology of range, using exclusive-or ("XOR") bit operations. Contiguous mask is a longword. Thus, there is a one-to-one correspondence between contiguous mask and the longword passed as input to circular priority find procedure 94. A bit in contiguous mask is on if the corresponding slot in hierarchical reservation vector is covered by the range topology of range.

Next, circular priority find procedure 94 applies contiguous mask to the longword and finds the first set bit in the result (i.e., process 94*c*). In the present embodiment, circular priority find procedure 94 can take advantage of a hardware-supported processor operation of processor to find the first set bit in a longword. Circular priority find procedure 94 returns the resulting bit or indicates that no such bit exists. This can happen, for instance, if all bits in the intersection of the range 91 and the given longword represent slots that are already allocated.

When the range 91 is not contiguous, circular priority find procedure 94 creates a low mask and a high mask (i.e., process 94*d*). In this case, range topology has a wrapped range. Low mask is a mask that selects bits of the input longword that correspond to the low component of wrapped range. Similarly, high mask is a mask that selects bits of the input longword that correspond to the high component of wrapped range.

Next, circular priority find procedure 94 applies low mask to the input longword and finds the first set bit in the result (i.e., process 94*e*). Circular priority find procedure 94 then determines whether process 94*e* found a set bit (i.e., process 94*f*). If so, circular priority find procedure 94 returns the resulting bit. Otherwise, circular priority find procedure 94 applies high mask to the input longword and finds the first set bit in that result (i.e., process 94*g*). Circular priority find procedure 94 returns the resulting bit or indicates that no such bit exists.

One advantage of reservation system applies to lookups of the first available time slot in a contiguous range of time slots—for instance, by the schedule next slot procedure. The hierarchy encoded in hierarchical reservation vector allows lookups to take advantage of register-based processor operations. This reduces the number of memory accesses needed to accomplish the lookup, relative to approaches that use processor operations that cannot be accomplished within the registers.

For example, a three-level hierarchical reservation vector keeps reservations for multiple calendars over 64K time slots. A processor provides 32-bit memory accesses and a 32-bit circular find first bit set. The hierarchical reservation vector keeps its top level (level 3) in two local registers as 64-bits. The reservation system can perform a search over the 64K time slots in four operations. One memory reference and a circular find first bit set reduces the candidates to 2048 time slots, while a second memory reference and another circular find first bit set to reduce the candidates to one.

In another advantage, the reservation system also supports circular lookups, i.e. lookups within a schedule where the range of possible values wraps around the end of the schedule and continues from the beginning of the schedule.

Still another advantage of the hierarchical reservation vector is a relatively small footprint in memory for its representation of the schedule space.

A number of embodiments have been described. Nevertheless, it will be understood that various modifications may be made without departing from the spirit and scope of the description.

In the described embodiment, schedule repository and VC repository are component software processes of routing/shaping software. In other embodiments, schedule repository or VC repository (or both) could be applications or services external to routing/shaping software. Indeed, schedule repository or VC repository (or both) could be external to router/traffic shaper—for instance, they could remote software in communication with routing/shaping software via network. In other embodiments, slots can be reserved to entities other than virtual connections.

The details of one or more embodiments are set forth in the accompanying drawings and the description below. Other features, objects, and advantages will be apparent from the description and drawings, and from the claims. Accordingly, other embodiments are within the scope of the following claims.

What is claimed is:

1. A computer-based method, comprising:
   scheduling data units for transmission within a time interval corresponding to one or more of a plurality of time slots represented by elements in a first-level vector, the time slots of the interval corresponding to selected elements of a contiguous block of elements in the first-level vector;
   representing groups of elements in the first-level vector by respective elements in a second-level vector having fewer elements than the first-level vector, with the quantity of elements included in the first-level vector being equal to the quantity of elements included in the second-level vector, scaled by a scaling factor; and
   representing groups of the groups of elements in a third-level vector having fewer elements than the second-level vector.

2. The method of claim 1, wherein the first-level vector includes a bit for each time slot in the plurality of time slots.

3. The method of claim 1, wherein positions in the first-level vector are ordered according to the sequence in time of the time slots.

4. The method of claim 1, wherein positions in the second-level vector are ordered according to the sequence of the corresponding groups of elements in the first-level vector.

5. A traffic shaping method, comprising:
   scheduling data units for transmission within a time interval represented by one or of a plurality of time slots, the time slots of the interval corresponding to selected time slots of a contiguous block of time slots; and
   representing the time slots in one or more hierarchical reservation vectors, the one or more hierarchical reservation vectors including;
     a first-level vector including one or more bits that each represent one time slot; and
     a second-level vector including one or more bits that each represent a group of time slots represented in the first-level vector
   wherein the one or more hierarchical reservation vectors further include a third-level vector including one or more bits that each represent a plurality of the groups of time slots represented in the second-level vector.

6. The method of claim 5 wherein the quantity of bits included in the first-level vector is equal to the quantity of bits included in the second-level vector, scaled by a first bit-scaling factor.

7. The method of claim 6 wherein the quantity of bits included in the second-level vector is equal to the quantity of bits included in the third-level vector, scaled by a second bit-scaling factor.

8. The method of claim 7 wherein the first bit-scaling factor and the second bit-scaling factor are equal.

9. The method of claim 8 wherein the first scaling factor is thirty-two, the second scaling factor is thirty-two, the second-level vector includes two-thousand-forty-eight bits, and the third-level vector includes sixty-four bits.

10. The method of claim 9 wherein the first-level vector includes sixty-four kilobits.

11. The method of claim 9 wherein the third-level vector is divided into a first thirty-two bit array and a second thirty-two bit array.

12. The method of claim 11 further comprising:
    storing the first thirty-two bit array in a first local register; and
    storing the second thirty-two bit array in a second local register.

13. The method of claim 5 wherein each bit in the second-level vector is indicative of the availability of one or more time slots within the group represented by that bit.

14. The method of claim 13 wherein each bit in the third-level vector is indicative of the availability of one or more time slots within the plurality of groups represented by that bit.

15. The method of claim 14 wherein scheduling data units comprises:
    identifying, within the third-level vector, a select plurality of groups having an available time slot;
    identifying, within the second-level vector, a select group of time slots, as chosen from the select plurality of groups, that includes the available time slot; and
    identifying, within the first-level vector, the available time slot, as chosen from the select group of time slots.

16. The method of claim 5 further comprising receiving one or more schedules that provide information including timing and boundaries.

17. The method of claim 16 wherein the schedules have a remote origin relative to the traffic shaper.

18. The method of claim 5 further comprising receiving available slot information from a virtual connection repository.

19. The method of claim 18 wherein the slot information includes a type parameter and a rate parameter.

20. The method of claim 19 wherein the type parameter include a bit rate control parameter.

21. The method of claim 19 wherein the rate parameter includes a quality parameter and a bandwidth parameter.

22. The method of claim 5, wherein the time slots are processed in the order in which the time slots become available.

23. The method of claim 5, wherein the plurality of time slots correspond to a transmission cycle that repeats.

24. The method of claim 23, further comprising:
calculating a could-send time based on a maximum data transfer rate; and
designating a first available time slot as a could-send time slot.

25. The method of claim 24, further comprising:
calculating a must-send time based on a minimum data transfer rate; and
designating a second available time slot as a must-send time slot.

26. The method of claim 25, further comprising reserving a range of time slots corresponding to a range of bits within a block of bits, the range of bits occurring between a bit representing the must-send time slot and a bit representing the could-send time slot, if it is determined that the range of bits is contiguous within the block when representing the must-send time slot as chronologically after the could-send time slot.

27. The method of claim 25, further comprising reserving:
a first range of time slots corresponding to a first range of bits within a block of bits, the first range of bits occurring between a bit representing a first end time slot represented in the block and a bit representing the must-send time slot; and
a second range of time slots corresponding to a second range of bits within the block, the second range of bits occurring between a bit representing the could-send time slot and a bit representing a second end time slot represented in the block,
if it is determined that the range of bits wraps around between the bit representing the first end time slot and the bit representing the second end time slot when representing the must-send time slot as chronologically after the could-send time slot.

28. A computer-readable medium embodied with a computer program to perform a method of storing executable instructions for traffic shaping, comprising:
schedule data units for transmission within a time interval represented by one or more of a plurality of time slots, the time slots of the interval corresponding to selected time slots of a contiguous block of time slots; and
represent the time slots in one or more hierarchical reservation vectors, the one or more hierarchical reservation vectors including:
a first-level vector including one or more bits that each represent one time slot; and
a second-level vector including one or more bits that each represent a group of time slots represented in the first-level vector;
wherein the one or more hierarchical reservation vectors further includes a third-level vector including one or more bits that each represent a plurality of the groups of time slots represented in the second-level vector.

29. The computer-readable medium of claim 28, wherein the quantity of bits included in the first-level vector is equal to the quantity of bits included in the second-level vector, scaled by a first bit-scaling factor and the quantity of bits included in the second-level vector is equal to the quantity of bits included in the third-level vector, scaled by a second bit-scaling factor.

30. The computer-readable medium of claim 29, wherein the first and second scaling factors are thirty-two, the first-level vector includes sixty-four kilobits, the second-level vector includes two-thousand-forty-eight bits, the third-level vector includes sixty-four bits, and the third-level vector is divided into a first thirty-two bit array and a second thirty-two bit array and; further comprising instructions for causing a computer to store the first thirty-two bit array in a first local register and store a second thirty-two bit array in a second local register.

31. The computer-readable medium of claim 29, wherein each bit in the second-level vector is indicative of the availability of one or more time slots within the group represented by that bit and each bit in the third-level vector is indicative of the availability of one or more time slots within the plurality of groups represented by that bit.

32. The computer-readable medium of claim 31, wherein the instructions to schedule data units further comprises instruction for causing a computer to:
identify, within the third-level vector, a select plurality of groups having an available time slot;
identify, within the second-level vector, a select group of time slots, as chosen from the select plurality of groups, that includes the available time slot; and
identify, within the first-level vector, the available time slot, as chosen from the select group of time slots.

33. The computer-readable medium of claim 31, further comprising instruction to cause a computer to:
receive one or more schedules that provide information including timing and boundaries,
receive available slot information including a type parameter and rate parameter from a virtual connection repository.

34. The computer-readable medium of claim 28, wherein the plurality of time slots correspond to a transmission cycle that repeats.

35. The computer-readable medium of claim 34, further comprising instruction to cause a computer to:
calculate a could-send time based on a maximum data transfer rate; and designating a first available time slot as a could-send time slot and
calculate a must-send time based on a minimum data transfer rate; and designating a second available time slot as a must-send time slot.

36. The computer-readable medium of claim 35, further comprising instruction to cause a computer to:
reserve a range of time slots corresponding to a range of bits within a block of bits, the range of bits occurring between a bit representing the must-send time slot and a bit representing the could-send time slot, if it is determined that the range of bits is contiguous within the block when representing the must-send time slot as chronologically after the could-send time slot.

37. The computer-readable medium of claim 35, further comprising instruction to cause a computer to:
reserve a first range of time slots corresponding to a first range of bits within a block of bits, the first range of bits occurring between a bit representing a first end time slot represented in the block and a bit representing the must-send time slot; and a second range of time slots corresponding to a second range of bits within the block, the second range of bits occurring between a bit representing the could-send time slot and a bit representing a second end time slot represented in the block, if it is determined that the range of bits wraps around between the bit representing the first end time slot and the bit representing the second end time slot when representing the must-send time slot as chronologically after the could-send time slot.

38. A router system, comprising
circuitry configured to schedule data units for transmission within a time interval represented by one or more of a plurality of time slots, the time slots of the interval corresponding to selected time slots of a contiguous block of time slots; and
circuitry configured to represent the time slots in one or more hierarchical reservation vectors, the one or more hierarchical reservation vectors including:
a first-level vector including one or more bits that each represent one time slot; and
a second-level vector including one or more bits that each represent a group of time slots represented in the first-level vector;
wherein the one or more hierarchical reservation vectors further include a third-level vector including one or more bits that each represent a plurality of the groups of time slots represented in the second-level vector.

39. The router system of claim 38, wherein the quantity of bits included in the first-level vector is equal to the quantity of bits included in the second-level vector, scaled by a first bit-scaling factor and the quantity of bits included in the second-level vector is equal to the quantity of bits included in the third-level vector, scaled by a second bit-scaling factor.

40. The router system of claim 39, wherein the first and second bit-scaling factors are thirty-two, the first-level vector includes sixty-four kilobits, the second-level vector includes two-thousand-forty-eight bits, the third-level vector includes sixty-four bits, and the third-level vector is divided into a first thirty-two bit array and a second thirty-two bit array and; further comprising storing the first thirty-two bit array in a first local register and storing the second thirty-two bit array in a second local register.

41. The router system of claim 40, further comprising circuitry configured to:
receive one or more schedules that provide information including timing and boundaries, and
receive available slot information including a type parameter and a rate parameter from a virtual connection repository.

42. The router system of claim 39, wherein each bit in the second-level vector is indicative of the availability of one or more time slots within the group represented by that bit and each bit in the third-level vector is indicative of the availability of one or more time slots within the plurality of groups represented by that bit.

43. The router system of claim 42, wherein scheduling data units comprises:
identifying, within the third-level vector, a select plurality of groups having an available time slot;
identifying, within the second-level vector, a select group of time slots, as chosen from the select plurality of groups, that includes the available time slot; and
identifying, within the first-level vector, the available time slot, as chosen from the select group of time slots.

44. The router system of claim 38, wherein the plurality of time slots correspond to a transmission cycle that repeats.

45. The router system of claim 44, further comprising circuitry configured to:
calculate a could-send time based on a maximum data transfer rate; and designating a first available time slot as a could-send time slot and calculate a must-send time based on a minimum data transfer rate; and designating a second available time slot as a must-send time slot.

46. The router system of claim 45, further comprising circuitry configured to:
reserve a range of time slots corresponding to a range of bits within a block of bits, the range of bits occurring between a bit representing the must-send time slot and a bit representing the could-send time slot, if it is determined that the range of bits is contiguous within the block when representing the must-send time slot as chronologically after the could-send time slot.

47. The router system of claim 45, further comprising circuitry configured to:
reserve a first range of time slots corresponding to a first range of bits within a block of bits, the first range of bits occurring between a bit representing a first end time slot represented in the block and a bit representing the must-send time slot; and a second range of time slots corresponding to a second range of bits within the block, the second range of bits occurring between a bit representing the could-send time slot and a bit representing a second end time slot represented in the block, if it is determined that the range of bits wraps around between the bit representing the first end time slot and the bit representing the second end time slot when representing the must-send time slot as chronologically after the could-send time slot.

48. A router system within a network of computers, comprising
circuitry configured to schedule data units received from the network of computers for transmission within a time interval represented by one or more of a plurality of time slots;
circuitry configured to represent the time slots in one or more hierarchical reservation vectors, the one or more hierarchical reservation vectors including:
a first-level vector including one or more bits that each represent one time slot wherein the plurality of time slots correspond to a transmission cycle that repeats;
a second-level vector including one or more bits that each represent a group of time slots represented in the first-level vector;
a third-level vector including one or more bits that each represent a plurality of the groups of time slots represented in the second-level vector; and
circuitry configured to:
identify, within the third-level vector, a select plurality of groups having an available time slot;
identify, within the second-level vector, a select group of time slots, as chosen from the select plurality of groups, that includes the available time slot;
identify, within the first-level vector, the available time slot, as chosen from the select group of time slots;
calculate a could-send time based on a maximum data transfer rate, and designate a first available time slot as a could-send time slot;
calculate a must-send time based on a minimum data transfer rate, and designate a second available time slot as a must-send time slot;
reserve a range of time slots corresponding to a range of bits within a block of bits, the range of bits occurring between a bit representing the must-send time slot and a bit representing the could-send time slot, if it is determined that the range of bits is contiguous within the block when representing the must-send time slot as chronologically after the could-send time slot; and reserve a first range of time slots corresponding to a first range of bits within a block of bits, the first range of bits occurring between a bit representing a first end time slot represented in the block and a bit representing the must-send time slot; and a second range of time slots corresponding to a second range of bits within the block, the second range of bits occurring between a bit representing the could-send time slot and a bit representing a second end time slot represented in the block, if it is determined that the range of bits wraps around between the bit representing the first end time slot and the bit representing the second end time slot when representing the must-send time slot as chronologically after the could-send time slot.

* * * * *